(12) United States Patent
Eyal et al.

(10) Patent No.: US 8,881,011 B2
(45) Date of Patent: Nov. 4, 2014

(54) TOOL FOR CREATING CONTENT FOR VIDEO SHARING PLATFORM

(75) Inventors: Aviv Eyal, New York, NY (US); Piers Haken, San Francisco, CA (US); David Charles Alexander Hodgson, San Francisco, CA (US); Steven Hazel, San Francisco, CA (US)

(73) Assignee: Crackle, Inc., Sausalito, CA (US)

( * ) Notice: Subject to any disclaimer, the term of this patent is extended or adjusted under 35 U.S.C. 154(b) by 750 days.

(21) Appl. No.: 11/950,206

(22) Filed: Dec. 4, 2007

(65) Prior Publication Data

US 2008/0184119 A1 Jul. 31, 2008

Related U.S. Application Data

(60) Provisional application No. 60/868,713, filed on Dec. 5, 2006.

(51) Int. Cl.
| | |
|---|---|
| G06F 3/00 | (2006.01) |
| H04N 7/173 | (2011.01) |
| H04N 21/81 | (2011.01) |
| H04N 21/4788 | (2011.01) |
| H04N 21/2743 | (2011.01) |
| H04N 21/8352 | (2011.01) |
| H04N 21/63 | (2011.01) |
| H04N 21/482 | (2011.01) |

(52) U.S. Cl.
CPC ........ H04N 7/17318 (2013.01); H04N 21/8153 (2013.01); H04N 21/4788 (2013.01); H04N 21/2743 (2013.01); H04N 21/8352 (2013.01); H04N 21/816 (2013.01); H04N 21/632 (2013.01); H04N 21/4828 (2013.01)
USPC .......................................... 715/723; 715/719

(58) Field of Classification Search
CPC ........................................................ G06F 3/00
USPC .................................................. 715/723, 719
See application file for complete search history.

(56) References Cited

U.S. PATENT DOCUMENTS

| | | |
|---|---|---|
| 5,864,854 A | 1/1999 | Boyle |
| 5,865,854 A | 2/1999 | Lim et al. |
| 6,253,198 B1 | 6/2001 | Perkins |
| 6,374,289 B2 | 4/2002 | Delaney et al. |
| 6,389,467 B1 | 5/2002 | Eyal |
| 6,484,199 B2 | 11/2002 | Eyal |
| 6,516,337 B1 | 2/2003 | Tripp et al. |
| 6,519,648 B1 | 2/2003 | Eyal |
| 6,633,901 B1 | 10/2003 | Zuili |

(Continued)

OTHER PUBLICATIONS

U.S. Appl. No. 11/950,301, filed Dec. 4, 2007, Eyal et al.

(Continued)

*Primary Examiner* — Doon Chow
*Assistant Examiner* — Le Nguyen
(74) *Attorney, Agent, or Firm* — Fitch, Even, Tabin & Flannery LLP

(57) ABSTRACT

A method for use in providing content includes hosting a network site on a computer network, displaying on the network site links to one or more videos, and displaying on the network site at least an on-demand preview of a first video in response to a corresponding one of the links being selected. A storage medium stores a computer program for use on a client computer. Several other methods, systems and programs are also disclosed.

19 Claims, 15 Drawing Sheets

(56) References Cited

U.S. PATENT DOCUMENTS

| | | | |
|---|---|---|---|
| 6,658,000 | B1 | 12/2003 | Raciborski et al. |
| 6,671,807 | B1 | 12/2003 | Jaisimha et al. |
| 6,675,205 | B2 | 1/2004 | Meadway et al. |
| 6,721,741 | B1 | 4/2004 | Eyal et al. |
| 6,725,275 | B2 | 4/2004 | Eyal |
| 6,728,760 | B1 | 4/2004 | Fairchild et al. |
| 6,735,628 | B2 | 5/2004 | Eyal |
| 6,742,023 | B1 | 5/2004 | Fanning et al. |
| 6,836,806 | B1 | 12/2004 | Raciborski et al. |
| 6,907,463 | B1 | 6/2005 | Kleinpeter, III et al. |
| 6,910,049 | B2 | 6/2005 | Fenton et al. |
| 6,954,456 | B2 | 10/2005 | Cranor et al. |
| 6,976,028 | B2 | 12/2005 | Fenton et al. |
| 6,976,053 | B1 | 12/2005 | Tripp et al. |
| 6,983,322 | B1 | 1/2006 | Tripp et al. |
| 6,990,498 | B2 | 1/2006 | Fenton et al. |
| 7,010,537 | B2 | 3/2006 | Eyal et al. |
| 7,032,000 | B2 | 4/2006 | Tripp |
| 7,072,982 | B2 | 7/2006 | Teodosiu et al. |
| 7,080,392 | B1* | 7/2006 | Geshwind .......... 725/34 |
| 7,089,301 | B1 | 8/2006 | Labio et al. |
| 7,111,079 | B2* | 9/2006 | Cheng .......... 709/249 |
| 7,133,870 | B1 | 11/2006 | Tripp et al. |
| 7,165,071 | B2 | 1/2007 | Fanning et al. |
| 7,174,334 | B2 | 2/2007 | Cherkasova |
| 7,174,385 | B2 | 2/2007 | Li |
| 7,228,305 | B1 | 6/2007 | Eyal et al. |
| 7,281,034 | B1 | 10/2007 | Eyal |
| 7,373,650 | B1* | 5/2008 | Rodriguez et al. .......... 725/41 |
| 7,509,340 | B2 | 3/2009 | Fenton et al. |
| 7,706,260 | B2 | 4/2010 | Cohen et al. |
| 8,082,348 | B1 | 12/2011 | Averbuj et al. |
| 2001/0022789 | A1* | 9/2001 | Huang et al. .......... 370/468 |
| 2002/0184208 | A1 | 12/2002 | Kato |
| 2003/0152904 | A1* | 8/2003 | Doty, Jr. .......... 434/350 |
| 2003/0233455 | A1 | 12/2003 | Leber et al. |
| 2004/0167890 | A1 | 8/2004 | Eyal |
| 2004/0177096 | A1 | 9/2004 | Eyal et al. |
| 2004/0199657 | A1 | 10/2004 | Eyal et al. |
| 2004/0268175 | A1* | 12/2004 | Koch et al. .......... 714/4 |
| 2005/0157753 | A1 | 7/2005 | Mayer |
| 2005/0165726 | A1* | 7/2005 | Kawell et al. .......... 707/1 |
| 2005/0246752 | A1 | 11/2005 | Liwerant et al. |
| 2006/0031240 | A1 | 2/2006 | Eyal et al. |
| 2006/0048186 | A1 | 3/2006 | Alterman |
| 2006/0075082 | A1* | 4/2006 | Haga et al. .......... 709/223 |
| 2006/0129917 | A1 | 6/2006 | Volk et al. |
| 2006/0218222 | A1 | 9/2006 | Brahmbhatt et al. |
| 2006/0230021 | A1 | 10/2006 | Diab et al. |
| 2006/0242178 | A1 | 10/2006 | Butterfield et al. |
| 2006/0294467 | A1* | 12/2006 | Auterinen .......... 715/723 |
| 2007/0094391 | A1 | 4/2007 | Nusset |
| 2007/0118801 | A1* | 5/2007 | Harshbarger et al. .......... 715/730 |
| 2007/0118853 | A1 | 5/2007 | Kreitzer et al. |
| 2007/0177586 | A1 | 8/2007 | Eyal et al. |
| 2007/0234214 | A1* | 10/2007 | Lovejoy et al. .......... 715/719 |
| 2007/0297417 | A1 | 12/2007 | Cohen et al. |
| 2008/0005336 | A1 | 1/2008 | Cohen et al. |
| 2008/0016531 | A1 | 1/2008 | Eyal et al. |
| 2008/0016538 | A1 | 1/2008 | Eyal et al. |
| 2008/0043625 | A1 | 2/2008 | Cohen |
| 2008/0140853 | A1 | 6/2008 | Harrison |
| 2008/0178230 | A1 | 7/2008 | Eyal et al. |
| 2008/0178234 | A1 | 7/2008 | Eyal et al. |
| 2008/0178242 | A1 | 7/2008 | Eyal et al. |
| 2008/0222295 | A1 | 9/2008 | Robinson et al. |
| 2009/0241043 | A9 | 9/2009 | Balthaser |
| 2009/0300673 | A1 | 12/2009 | Bachet et al. |
| 2010/0199123 | A1 | 8/2010 | Cohen |

OTHER PUBLICATIONS

U.S. Appl. No. 11/950,158, filed Dec. 4, 2007, Eyal et al.
U.S. Appl. No. 11/950,296, filed Dec. 4, 2007, Eyal et al.
Friskit, Inc.; "About Friskit"; <http://friskit.com/>; Printed from the Internet on Mar. 29, 2007; pp. 1-3.
Friskit, Inc.; "Welcome to Friskit!"; <http://friskit.com/index.htm>; Printed from the Internet on May 14, 2008; pp. 1-8.
Wikipedia; "BitTorrent Inc."; <http://en.wildpedia.org/wiki/BitTorrent%2C_Inc.>; Printed from the Internet on May 14, 2008; pp. 1-2.
Wikipedia; "BitTorrent (software)"; <http://en.wikipedia.org/wiki/BitTorrent_%28software %29>; Printed from the Internet on May 14, 2008; pp. 1-2.
Wikipedia; "BitTorrent (protocol)"; <http://en.wikipedia.org/wiki/BitTorrent_%28protocol%29>; Printed from the Internet on May 14, 2008; pp. 1-8.
Wikipedia; "BitTorrent client"; <http://en.wikipedia.org/wiki/BitTorrent_client>; Printed from the Internet on May 14, 2008; pp. 1-8.
Yahoo! Tech Groups; "BitTorrent"; <http://tech.groups.yahoo.com/group/bittorrent/>; Printed from the Internet on May 14, 2008; pp. 1-2.
Sourceforge.net; "Index of BitTorrent"; <http://bittorrent.cvs.sourceforge.net/bittorrent/BitTorrent/>; Printed from the Internet on May 14, 2008; pp. 1-2.
Sourceforge.net; "Shareaza"; <http://sourceforge.net/projects/shareaza>; Printed from the Internet on May 14, 2008; pp. 1-2.
Sourceforge.net; "BitTorrent"; <http://sourceforge.net/projects/bittorrent>; Printed from the Internet on May 14, 2008; p. 1.
Sourceforge.net; "Azureus"; <http://sourceforge.net/projects/azureus>; Printed from the Internet on May 14, 2008; pp. 1-2.
Bittorrent.com; "BitTorrent DNA >> Technology"; <http://www.bittorrent.com/dna/technology/>: Printed from the Internet on May 14, 2008; pp. 1-3.
USPTO; Office Action issued in U.S. Appl. No. 11/950,158; mailed on Jun. 7, 2010; 16 pages.
USPTO; Office Action issued in U.S. Appl. No. 11/950,301; mailed on Jun. 8, 2010; 10 pages.
USPTO; Office Action issued in U.S. Appl. No. 11/950,296; mailed on Jun. 8, 2010; 8 pages.
USPTO; Advisory Action issued in U.S. Appl. No. 11/950,301; Mailed Jan. 16, 2014; 3 Pages.
USPTO; Final Office Action issued in U.S. Appl. No. 11/950,158; mailed Dec. 21, 2010; 21 pages.
USPTO; Final Office Action issued in U.S. Appl. No. 11/950,301; mailed on Dec. 21, 2010; 14 pages.
USPTO; Final Office Action issued in U.S. Appl. No. 11/950,296; mailed Dec. 22, 2010; 15 pages.
USPTO; Non-Final Office Action issued in U.S. Appl. No. 11/950,158; mailed Jun. 21, 2011; 24 pages.
USPTO; Non-Final Office Action issued in U.S. Appl. No. 11/950,296; mailed Jun. 22, 2011; 16 pages.
USPTO; Non-Final Office Action issued in U.S. Appl. No. 11/950,301; mailed Jun. 27, 2011; 15 pages.
USPTO; Non-Final Office Action issued in U.S. Appl. No. 11/950,158; Mailed Sep. 19, 2012; 25 Pages.
USPTO; Non-Final Office Action issued in U.S. Appl. No. 11/950,301; Mailed Jan. 30, 2013; 20 Pages.
USPTO; Non-Final Office Action issued in U.S. Appl. No. 11/950,296; Mailed Feb. 11, 2013; 20 Pages.
USPTO; Final Office Action issued in U.S. Appl. No. 11/950,158; Mailed May 29, 2013; 26 Pages.
USPTO; Examiner's Answer issued in U.S. Appl. No. 11/950,301; mailed Jun. 30, 2014; 13 pages.

* cited by examiner

TOOL FOR CREATING CONTENT FOR VIDEO SHARING PLATFORM

CROSS-REFERENCE TO RELATED APPLICATIONS

This application claims the benefit of U.S. Provisional Patent Application No. 60/868,713, filed Dec. 5, 2006, entitled "VIDEO SHARING PLATFORM," the entire disclosure of which is hereby incorporated herein by reference in its entirety.

This application is related to U.S. patent application Ser. No. 11/950,158, filed on the same date as this application, entitled "VIDEO SHARING PLATFORM PROVIDING FOR PUBLIC AND PRIVATE SHARING AND DISTRIBUTED DOWNLOADS OF VIDEOS," the entire disclosure of which is hereby incorporated herein by reference in its entirety.

This application is related to U.S. patent application Ser. No. 11/950,301, filed on the same date as this application, entitled "VIDEO SHARING PLATFORM PROVIDING FOR POSTING CONTENT TO OTHER WEBSITES," the entire disclosure of which is hereby incorporated herein by reference in its entirety.

This application is related to U.S. patent application Ser. No. 11/950,296, filed on the same date as this application, entitled "VIDEO SHARING PLATFORM PROVIDING FOR DOWNLOADING OF CONTENT TO PORTABLE DEVICES," the entire disclosure of which is hereby incorporated herein by reference in its entirety.

BACKGROUND OF THE INVENTION

1. Field of the Invention

The present invention relates generally to content sharing and delivery, and more specifically to the sharing and delivery of video over large networks such as the Internet.

2. Discussion of the Related Art

The proliferation of digital content and the ability to easily distribute such content via the Internet has provided the public with immense convenience, efficiency and flexibility. Furthermore, the ability to easily distribute content via the Internet has also created opportunities to provide entertaining websites, applications, etc.

It is with respect to these and other background information factors that the present invention has evolved.

SUMMARY OF THE INVENTION

One embodiment provides a storage medium storing a computer program for use in creating content on a client computer, the computer program causing the client computer to execute steps comprising: displaying on a display screen of the client computer a tool for creating videos; creating a first video in response to user interaction with the tool; communicating through a computer network to upload information relating to the first video to a database that stores information relating to a plurality of videos including video data information of some or all of the created first video; displaying on the display screen of a second client computer an on-demand preview of the first video using the uploaded video data information; making available on a display screen of the second client computer a command to download the first video; and initiating a download of the created first video to the second client computer in pieces from two or more computers on the network that have some of the created video data in response to the user of the second client computer selecting the command.

Another embodiment provides a method for use in creating content, comprising: displaying on a display screen of a client computer a tool for creating videos; creating a first video in response to user interaction with the tool; communicating through a computer network to upload information relating to the first video to a database that stores information relating to a plurality of videos including video data information of some or all of the created first video; displaying on the display screen of a second client computer an on-demand preview of the first video using the uploaded video data information; making available on a display screen of the second client computer a command to download the first video; and initiating a download of the created first video to the second client computer in pieces from two or more computers on the network that have some of the created video data in response to the user of the second client computer selecting the command.

Another embodiment provides a system for use in creating content, comprising: a first client computer that is configured to display on a display screen of the first client computer a tool for creating videos, create a first video in response to user interaction with the tool, communicate through a computer network to upload information relating to the first video to a database that stores information relating to a plurality of videos including video data information of some or all of the created first video; and a second client computer that is configured to display on a display screen of the second client computer an on-demand preview of the first video using the uploaded video data information and a command to download the first video, and that is configured to initiate a download of the created first video to the second client computer in pieces from two or more computers on the network that have some of the created video data in response to the user of the second client computer selecting the command.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Various embodiments of the present invention provide various methods, techniques and features that may be used in a video sharing platform. A video sharing platform generally comprises a website or software where a user can distribute video clips. Some embodiments provide for a video sharing platform itself.

Some embodiments allow users to watch, share and create video on the Web, desktop and/or connected devices. Some embodiments may be used in the so-called user-generated video space in which users browse videos on a video sharing website and have the option to post them to a wide variety of third party websites directly from the video sharing website. For example, in some embodiments, with one-click, users can add video to their personal pages on a social networking website (e.g., MySpace, Facebook, Y!360, Friendster, Blogger, etc.) and/or any other webpage.

Figure 1:
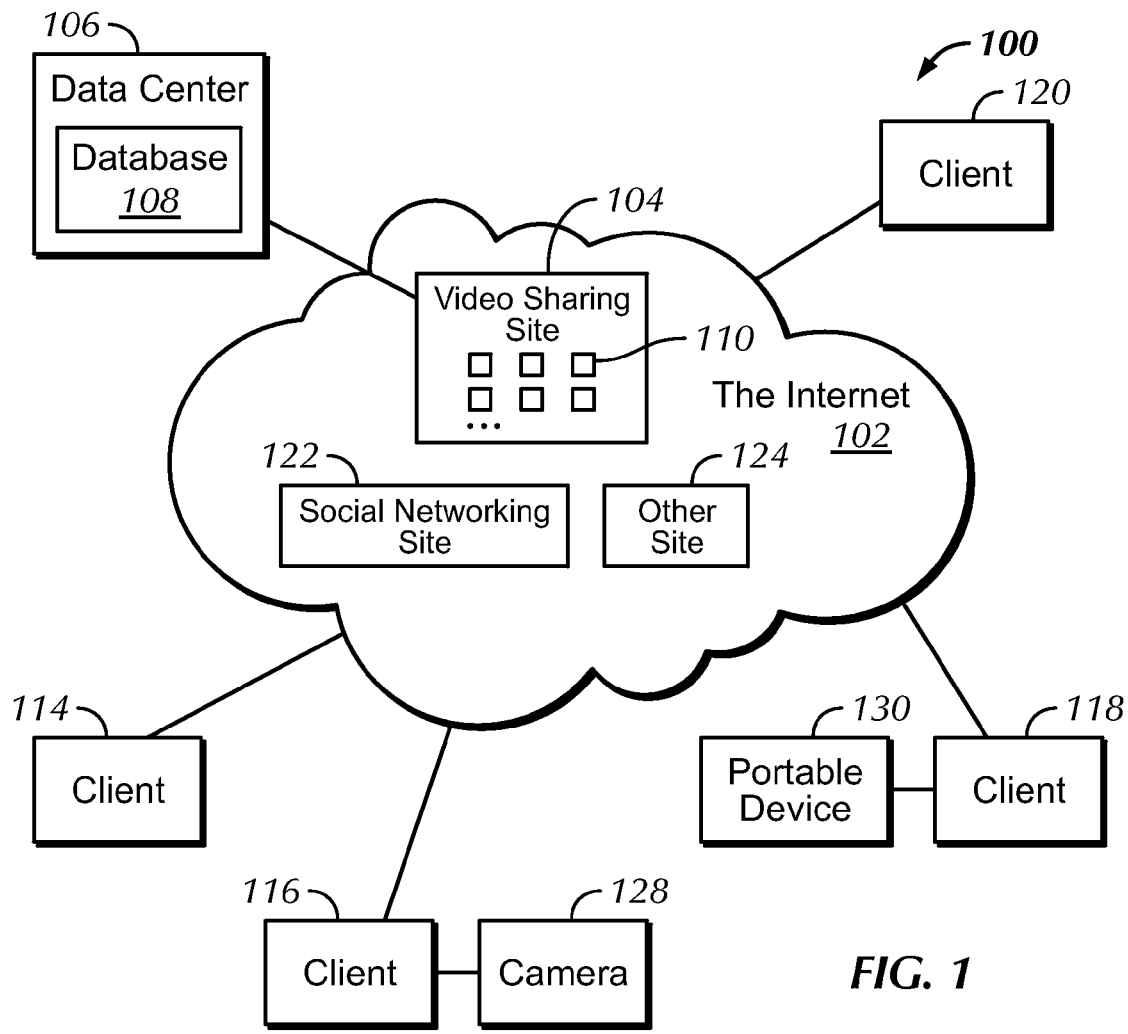
FIG. 1 is a block diagram illustrating a system that operates in accordance with an embodiment of the present invention.

Referring to FIG. 1, there is illustrated a system 100 that operates in accordance with an embodiment of the present invention. The system 100 includes a computer network 102, such as for example the Internet. A network site 104, such as for example a video sharing site, may be hosted on the network 102. A data center 106 associated with the network site 104 includes a database 108. The data center 106 may communicate with the network site 104 through the computer network 102. In some embodiments the database 108 stores information relating to a plurality of videos, and the network site 104 may include links 110 to one or more of the videos.

In some embodiments at least an on-demand preview of one of the videos may be displayed on the network site 104 in response to a corresponding one of the links being selected. An option to download a video may also be displayed on the network site 104. In some embodiments a video is downloaded to a client computer by running a client software application on the client computer in response to the download option being selected. In general, streaming may comprise playing a file as it downloads, without having to wait for the download to finish, whereas with downloading the file is copied from the Web sever to the user's computer.

In some embodiments a tool for searching through the videos may be displayed on the network site 104. A result of a search through the videos may be displayed on the network site 104 in response to a search.

One or more client computers or other devices 114, 116, 118, 120 may also be connected or have access to the network 102. Such client computers may be used to visit the network site 104, or other sites such as a social networking site 122, or any other site, such as the site 124.

In some embodiments the client computers or other devices 114, 116, 118, 120 may include a client software application that facilitates communication through the computer network 102 with the data center 106 and database 108. Links to one or more of the videos associated with the database 108 may be displayed on a display screen of the client computer. Furthermore, at least an on-demand preview of videos may be displayed on the display screen of the client computers in response to a corresponding one of the links being selected. In some embodiments an option to download a video may be displayed on the display screen of the client computer. In some embodiments the client software application may facilitate other functions, as will be described below.

Figure 2:
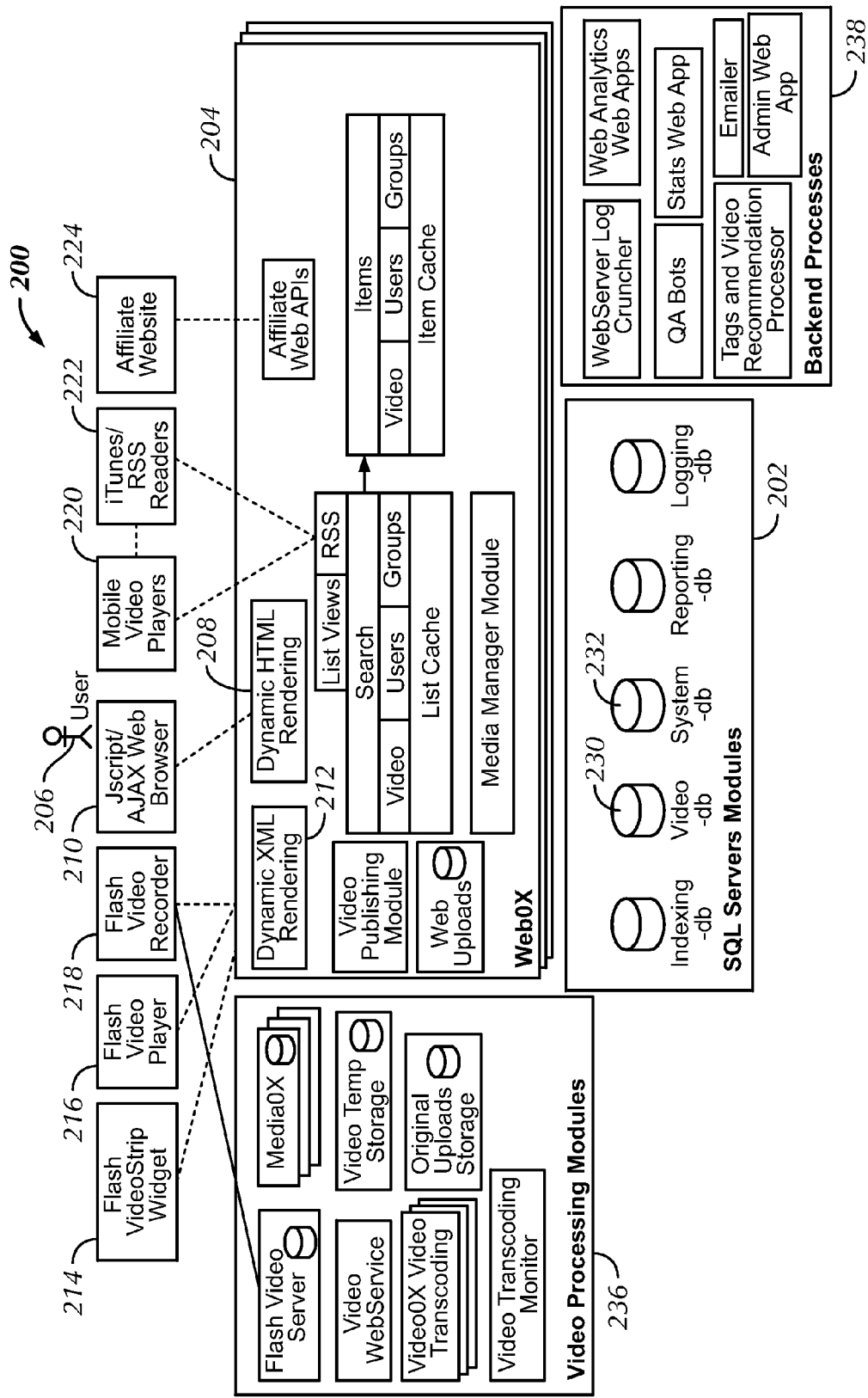
FIG. 2 is a block diagram illustrating an example architecture that may be used for the data center shown in FIG. 1 in accordance with an embodiment of the present invention.

An example architecture that may be used for the data center 106 in accordance with an embodiment of the present invention is illustrated in FIG. 2. Specifically, the example architecture 200 includes a database 202 and a media manager 204. Similar to as described above, the database 202 may store information relating to a plurality of videos. The database 202 may include one or more separate or subdivided databases, such as for example a video database 230 for storing information and/or data related to videos, and a system database 232 for storing system information such as for example user or member information and other information or data.

In some embodiments many different outputs may be used with the media manager 204 to provide output to a user 206. For example, dynamic HTML rendering 208 may be used to render to a web browser 210. Dynamic XML rendering 212 may also be used for applications such as client applications, web-based applications and web services that consume XML data such as RSS readers, Apple iTunes Software, SONY PSP Media Manager and Internet video search engines that can consume XML and Media RSS feeds. In some embodiments output may be to a flash videostrip widget 214 and/or a flash video player 216, both of which will be described below. In some embodiments a flash video recorder 218 may be used to provide input to the architecture 200. In some embodiments output may also be provided to mobile video players 220 and portable audio or RSS (really simple syndication) readers 222. In some embodiments output may also be provided to one or more affiliate websites 224.

In some embodiments the architecture 200 may includes a video processing module 236 and a backend processes module 238. By way of example, the video processing module 236 may be used to process the video received from the flash video recorder 218. The backend processes module 238 may be used for one or more of web server logs, web analysis, QA bots, statistics, tags, as an emailer, admin web applications, etc.

Figure 3:
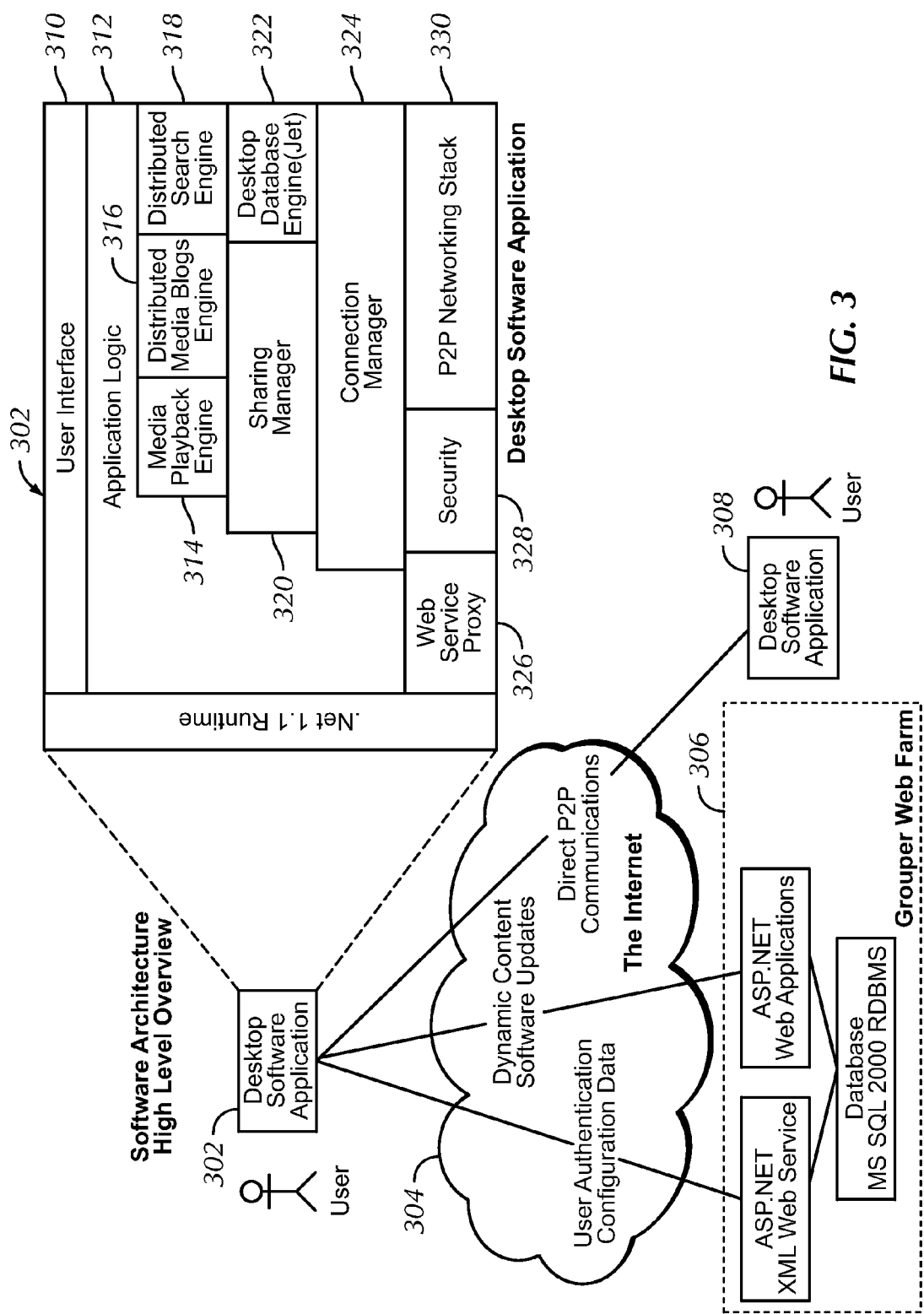
FIG. 3 is a block diagram illustrating an example architecture that may be used for a client software application in accordance with an embodiment of the present invention.

An example client software application that may be used in accordance with an embodiment of the present invention is illustrated in FIG. 3. Specifically, as mentioned above, a client software application 302 may be used to facilitate communication through a computer network 304 with a data center 306. In addition, in some embodiments the client software application 302 may also be used to facilitate communication through the computer network 304 with other peer client computers 308.

In some embodiments, the client software application 302 may include a user interface 310, application logic 312, media playback engine 314, distributed media blogs engine 316, distributed search engine 318, sharing manager 320, desktop database engine 322, connection manager 324, web service proxy 326, security layer 328, and peer-to-peer (P2P) networking stack 330.

Some embodiments of the present invention provide for public and private sharing of videos or other content. Namely, in some embodiments, the network site 104 (FIG. 1) may be used to share videos privately, such as sharing within small groups of family, friends and people of related interests. In some embodiments, the network site 104 (FIG. 1) may be used to share videos publicly. Namely, users may share and download video and image files publicly. In some embodiments, the client software application may include a "share publicly" icon. By clicking this icon a user can share videos and photos publicly, e.g. with the entire world. Anyone can look at the network site 104 and peruse the images and videos that are shared publicly.

Figure 4:
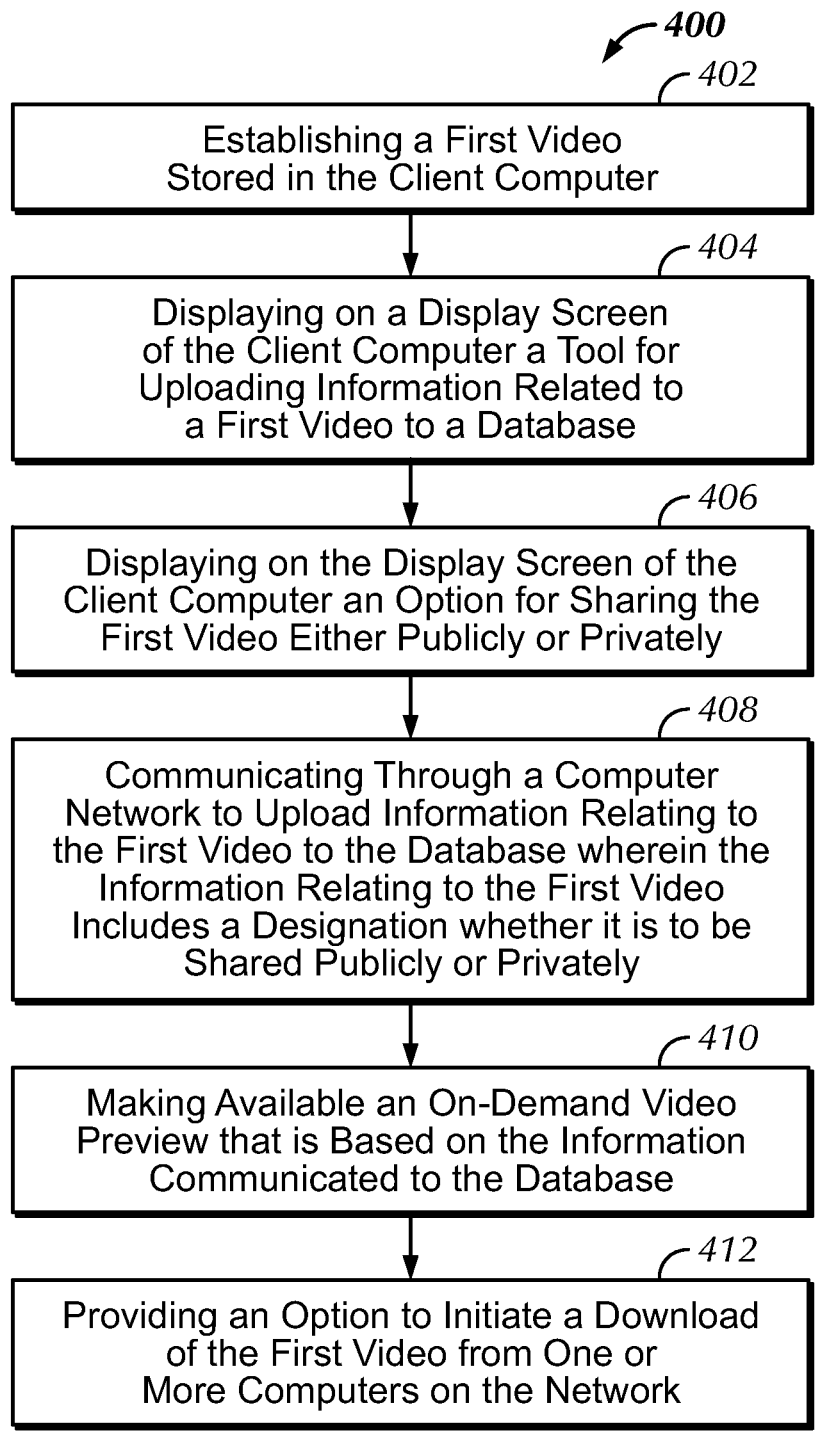
FIG. 4 is a flow diagram illustrating a method that operates in accordance with an embodiment of the present invention.

For example, in some embodiments a client software application for use in uploading content from a client computer may cause the client computer to execute the following steps, which are illustrated in FIG. 4 as the method 400. Namely, in step 402 a first video is established in the client computer. In step 404 a tool for uploading information related to a first video to a database may be displaying on a display screen of the client computer. The database may store information relating to the video where the information may include some or all the video. In some embodiments, the information may include a digital video file that is generated from the first video and includes a representation of some or all of the first video's video data and audio data. The information can also include metadata related to the video, such as author or classification information, or comments. Metadata can be provided by the uploading user, a user that has accessed the video, or an operator or administrator of the server system. Next, in step 406 an option for sharing the first video either publicly or privately may be displayed on the display screen of the client computer. Then, in step 408 information relating to the first video may be uploaded to the database. The information relating to the first video may include a designation whether it is to be shared publicly or privately.

In some embodiments an on-demand video preview that is based on the information communicated to the database may be made available on the network, which is indicated by step 410. Such a video sample on the site may be, for example, up to 3 minutes long, or a different length. In step 412 a means or option to initiate a download of a video from one or more computers on the network may be provided. In some embodiments, the downloading of the video may be by means of a distributed download, which will be discussed below. For example, the video may be downloaded in pieces from two or more computers or other devices on the network. In some embodiments such downloading of clips and images may be restricted to members of the site. Each uploader's biography may be present by the media so people can find out about groups and ask for an invite.

Thus, in the video sharing process a user may share a file on his PC privately or publicly. A client may build hashes for the file and add the user as a file source to a file tracker (discussed below). A client may create a video preview and upload it to the network site 104 for on-demand streaming or download.

In some embodiments the user can specify to send an email with a link to shared video to friends and family. The data center 106 may generate a special URL for the video, and other clients may download the files through the special URL.

The video sharing process may also be determined during web uploads. Namely, a user may share video publicly or privately by uploading it to the network site 104. The data center 106 may store the original video and generate an MP4 file for the uploaded file. The first download request for the original file may be served from the network site 104 storage. Clients that downloaded the file may become file sources and additional download requests are served from them (discussed below).

In some embodiments commercial video content may also be shared. Namely, such video may be added to the database 108. The data center 106 may transcode the content for on-demand streaming and download (e.g., for mobile and/or portable video players). A video page may be generated for the content that may be discoverable on the network site 104. Users may download the content via a special URL that may be made available on the network site 104. Downloaders (client systems that will or have downloaded a file) may become video sources and additional downloaders use them as such (discussed below).

Some embodiments of the present invention provide for distributed downloads of content, such as videos. For example, when a public or private video is made available for distributed download, a hash of that file is generated for the purpose of uniquely identifying that file throughout the network. The hash contains a recursively hierarchical hash of parts of that file (for example, Tiger-Tree). When a user initiates a download of this file, the system provides means to locate one or more computers that have already downloaded all or part of the file. The downloader downloads both the hash and parts the file from the given sources, verifies the validity of the downloaded parts and assembles the parts to an identical copy of the downloaded file.

As another example, in some embodiments, when a public or private piece of media is downloaded from another member, the system will chop the file up into blocks, or hash files. The code leading to the chunks of the files are stored in the settings for the client software application. When another person initiates a download of the same file, they may get blocks from anyone else who has previously downloaded a portion of that file. In addition, the downloads of multiple pieces of a file from respective peers can proceed in parallel. This provides for improved efficiency and in some cases speed of downloads.

So potentially, even though the original downloader computer may be offline, complete versions or enough parts from, multiple members exist so that the transfer can happen even in his computer's absence. This distribution of the load also results in less upstream bandwidth used per member and thus quicker, more efficient downloading. In some cases, where downloaders downstream bandwidth is greater than uploaders upstream bandwith, this system provides a faster download compared to a non distributed download. In some cases, the system require less upstream bandwidth use from network servers that provide files for downloading, as the upload bandwidth requirements are spread between two or more servers. In some cases, the system provides a greater reliability than single-sourced downloading systems because downloads can continue when a server that offers a file goes offline in the cases that the parts of the file are already distributed to one or more additional network servers by the system. Media shared within a private group may not be accessible to members outside the group, which can help protect privacy. And in the public realm, a user may remain invisible to the members downloading blocks of public shared media from him or her. The system robot may only seek blocks matching the code of the file the user is trying to download.

Figure 5:
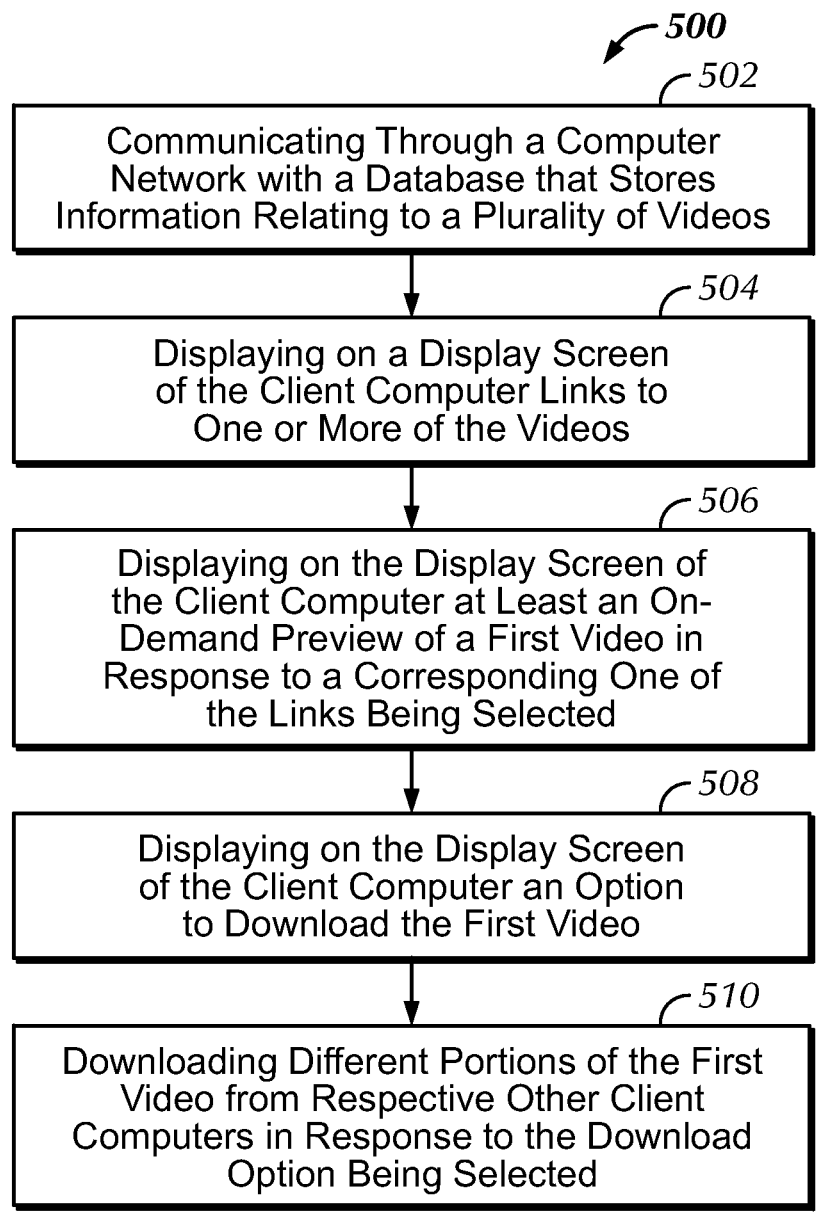
FIG. 5 is a flow diagram illustrating a method that operates in accordance with another embodiment of the present invention.

For example, in some embodiments the client software application may cause the client computer to execute the following steps, which are illustrated in FIG. 5 as the method 500. Namely, in step 502 the client computer may communicate through a computer network with a database that stores information relating to a plurality of videos. In step 504 the client computer may display on a display screen of the client computer links to one or more of the videos. In step 506, at least an on-demand preview of a first video may be displayed on the display screen of the client computer in response to a corresponding one of the links being selected. In step 508, an option to download the first video may be displayed on the display screen of the client computer. And in step 510, when the download option is selected, different portions of the first video may be downloaded from respective other client computers (e.g., as identified by the database or an associated server). For example, in some embodiments, the first video may be downloaded in pieces from two or more computers or other devices on the network.

As another example, in some embodiments the first video may be downloaded to two client computers by running a computer program on the client computer in response to the download option being selected on each of the client computers. The program may download the video in chunks, where the initial chunks download operations, on the first client computer, downloads the video from one server on the network. The subsequent chunk download operations, from a second client computer, download the chunks coming from two or more servers or computers on the network, where each server has chunks that correspond to some or all of the first video data. Thus, for example, for three client computers, c1, c2 and c3, assume that computer c1 shares the video. Computer c2 starts downloading chunks from computer c1. Computer c3 starts downloading the chunks from c1 and c2. Computer c2 downloads additional chunks from computer c3. In the discussion herein, a server may refer to a peer computer.

Figure 6:
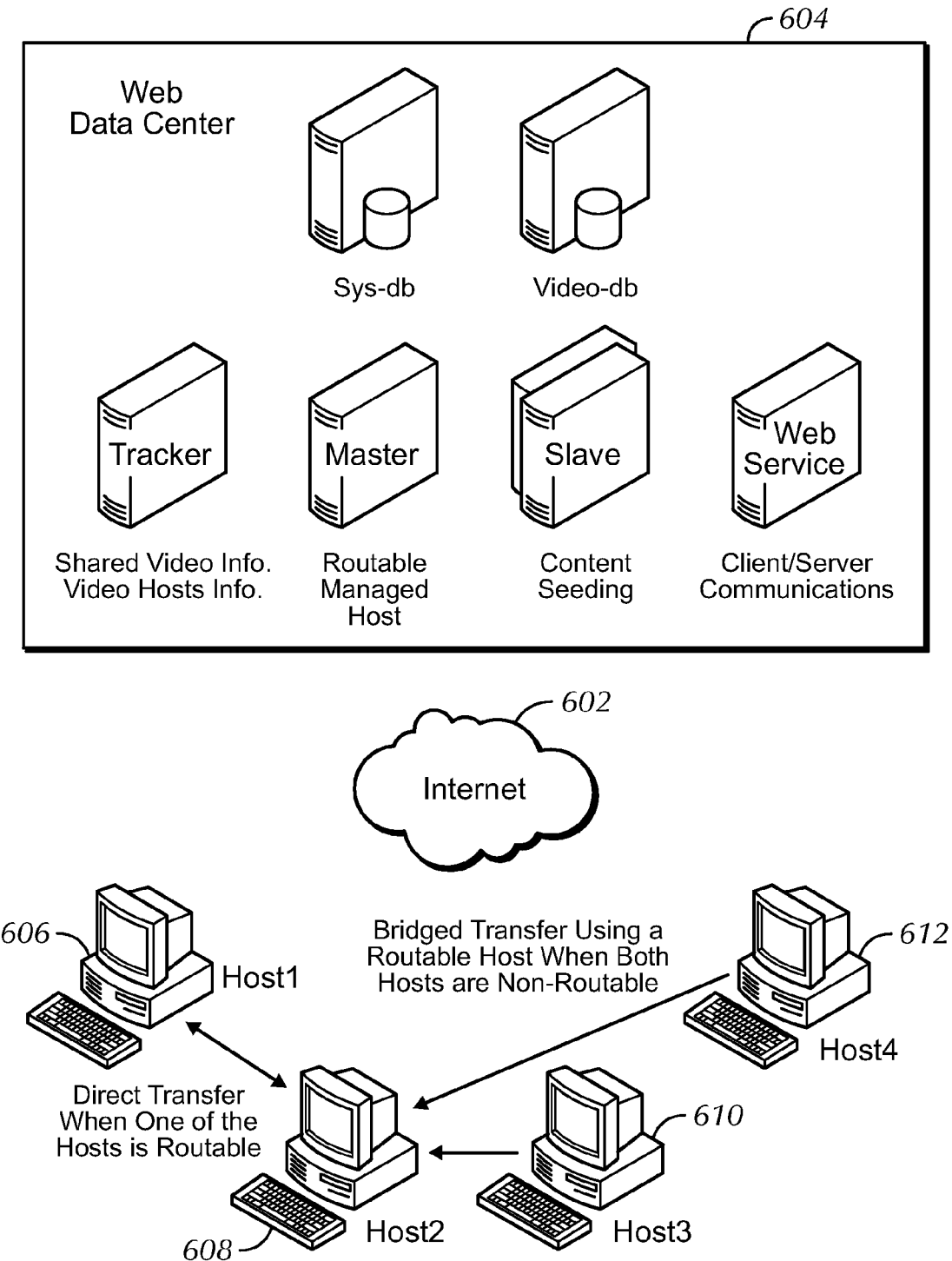
FIG. 6 is a block diagram illustrating an example of a distributed download in accordance with an embodiment of the present invention.

FIG. 6 illustrates an example of a distributed download process in accordance with an embodiment of the present invention. Similar to as described above, a network 602 may have connected thereto a data center 604 and several client computers 606, 608, 610, 612.

In some embodiments, during the video download process a user may click a video special URL in a webpage or click to download video from the client software application. The client software application may request a list of file sources and routability information from the system tracker. The client starts requesting binary file chunks from routable sources and downloads the chunks. The system tracker may add the client as a source for the file for future downloads. A system slave (or multiple slaves) may be used to supply pieces of the file as well (e.g., as a last resort for initial file distribution). A client file transfer manager may track the progress. The client software application assembles the files from the chunks and notifies the user when the download is complete.

As shown, a direct transfer may take place between clients 606 and 608 when one of the hosts is routable. A bridged transfer may take place between client 606 and hosts 610, 612 and using a routable host 608 when both hosts are non-routable.

In some embodiments, the distributed downloads technology may comprise a peer-to-peer (P2P) file transfer technology that allows users to download files directly from one or more users and likewise upload files to one or more users simultaneously. The technology may comprise one component of the client software application.

This technology may be used for the distribution of large video files as well as file transfers in a private group setting. In some embodiments, the technology may include one or more of the following benefits:

Unlimited Sharing. Users may share unlimited number of files without limitation on file size and download large files directly from other users.

No Central Hosting. The data center 404 does not need to centrally host shared files on its web servers. Files may be served directly from the user(s) sharing them.

Scalability. Distributed Downloads may be much more scalable compared to downloads from web or ftp server. With distributed downloads, a multitude of people can download the same large file over the Internet without hogging the server that initially made the file available and without consuming massive amount of bandwidth by the server. With distributed downloads, the bandwidth used to download a file is spread between all the PCs that have started to download the file.

Faster Downloads. Downloads of popular files may be faster because the sum of the upstream bandwidth used for file transfers by the sources that have partially or completely downloaded the file is typically greater than the upstream bandwidth from a single file source.

High Availability. File availability may be higher than other file sharing technology, as the original file sharer does not need to be online for the file transfer to occur (assuming that at least one user "seeding" the file is online at any given time).

Thus, the distributed file sharing system may be more scalable and cheaper to operate than a centrally hosted file distribution system and it may provide a better file sharing experience to users compared to previous systems. This may be due to higher availability for popular files, better download speeds, and conservation of users upstream bandwidth.

Regarding distributed downloads and video sharing, in some embodiments when users share a video clip file privately or publicly, a video preview of up to the first 2, 3, 4, . . . 10, etc. minutes (or some other length) of the source video clip may be created and made available for streaming over the web on the network site. All major video formats such as QuickTime, Windows Media, MPG, and MPG4 may be supported. A visitor to the network site may watch the streaming preview and initiate a distributed download of the shared video by clicking on a special download link. The client software downloads the shared video clip identified by the link using its distributed download technology.

Regarding distributed downloads and private group sharing, the system may allow users to share files in private group settings. A member of a group may browse files shared by other members and request to download them. Downloads may be implemented using distributed downloads. All distributed downloads for group file sharing may be encrypted end-to-end using any encryption technology.

Regarding distributed downloads and upstream bandwidth conservation, an issue with traditional P2P file transfers is upstream bandwidth hogging. Upstream bandwidth hogging occurs when P2P file transfers use all of the upstream bandwidth that is available to the user on his Internet connection. This may cause other Internet applications running on the user's computer to become slow or to fail to work. Distributed downloads technology may prevent hogging of users upstream bandwidth when other users are downloading files from them. The software monitors its use of upstream bandwidth and will slowdown in-progress file uploads to remain below a percentage of bandwidth allocated to the system.

The client software may default to use up to 90% of a typical home broadband upstream bandwidth (512 kbps). Users with faster or slower connections can set a manual limit on the bandwidth allocated to the system. In addition, the client software may have a notion of different categories of data transfers, such as thumbnail transfer, file transfers, and audio streaming. To ensure good user experience, limits may be applied to each category individually. This technology may allow transfers to use another category's bandwidth if there is some to spare. So the percentage allocated to a specific category is just what is reserved for that category if it tries to use that bandwidth.

The tracker may comprise a centralized network service that keeps track of which user PC has what file. The tracker may be used by the client software to obtain an initial list of sources (PCs running the client software) that have some or all of a requested file. Information about an instance of the client software that is running on a user's PC may be added to the tracker when that instance starts to download a file. In addition, the client software may act as a tracker for files that are shared from that PC privately in a group.

Regarding file blocks and hashes, distributed downloads may be implemented using, e.g., Merkle hash trees. Files may be transferred in blocks over the Internet and blocks may be assembled into complete files on the downloader PC. Hash trees may be used to guard against file corruption, be it malicious in nature or otherwise.

The following references at the indicated Internet addresses are related to distributed downloads technology and the entire contents of each are hereby incorporated herein by reference in their entirety: Shareza open source p2p software: http://sourceforge.net/projects/shareaza/; Open Source bittorrent client: http://sourceforge.net/projects/azureus/; Bittorent open source project: http://sourceforge.net/projects/bittorrent/; http://bittorrent.cvs.sourceforge.net/bittorrent/Bittorrent/; Yahoo Bittorent Group: http://tech.groups.yahoo.com/group/Bittorrent/; and http://en.wikipedia.org/wiki/Hash_tree.

Some embodiments of the present invention provide for video viewing and downloading from the network site 104 (FIG. 1). That is, videos may be available for viewing and downloading on the network site 104. When a member publicly shares a video a sample may be put up to view. By way of example, in some embodiments the sample may be up to 3 minutes (or some other length), so in some cases users can see most or all of a video offering. In some embodiments if a user wants to download a file and his or her computer includes the client software application, then one click may open the client and immediately begin downloading the file. If the user's computer does not include the client software, then the software can be downloaded (e.g., manually or automatically).

Figure 7:
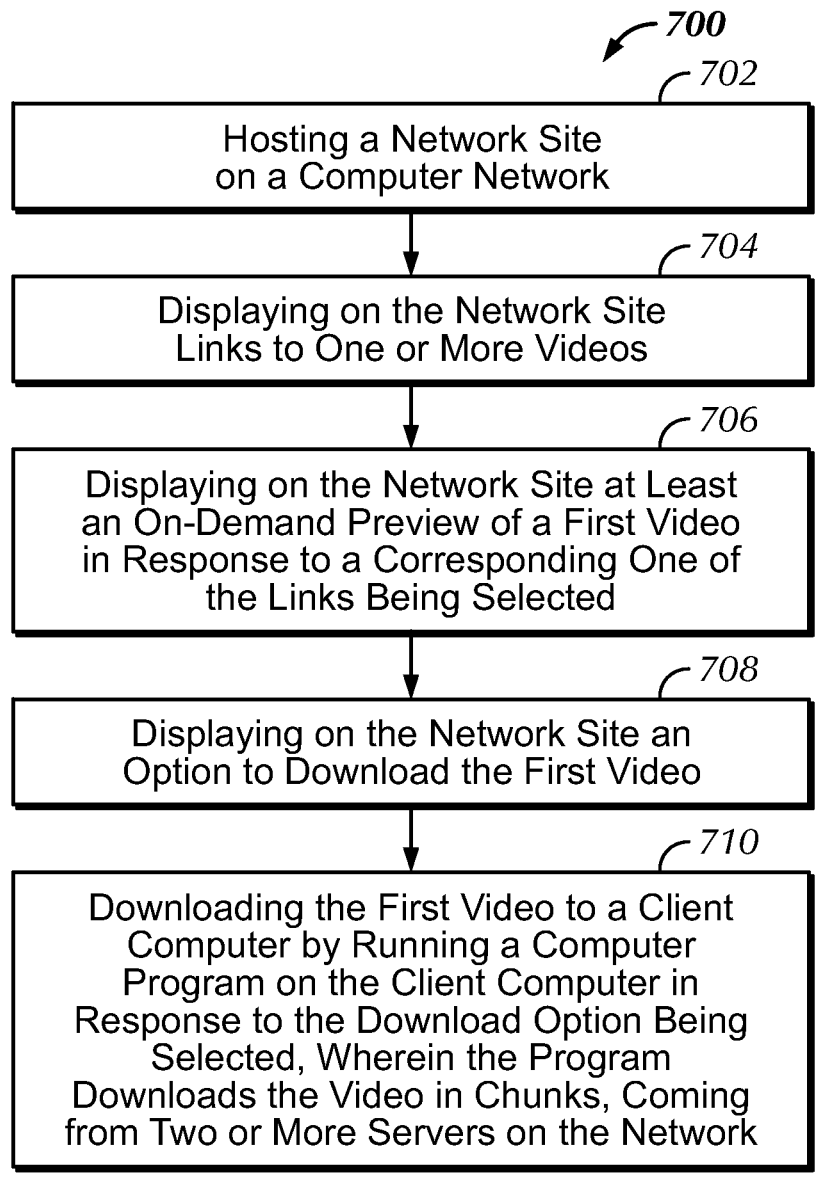
FIG. 7 is a flow diagram illustrating a method that operates in accordance with another embodiment of the present invention.

For example, in some embodiments a method for use in providing content may comprise the following steps, which are illustrated in FIG. 7 as the method 700. Namely, in step 702 a network site may be hosted on a computer network, and in step 704 links to one or more videos may be displayed on the network site. In step 706 at least an on-demand preview of a first video may be displayed on the network site in response to a corresponding one of the links being selected, and in step 708 an option to download the first video may be displayed on the network site.

In step 710, the first video may be downloaded to a client computer by running a computer program on the client computer in response to the download option being selected. The program may download the video in chunks, coming from two or more computers or servers on the network. That is, the downloading may comprise a distributed download as described above where, for example, the video is downloaded in pieces from two or more computers or other devices on the network. A similar process can be applied to stream video from the server or from multiple peers.

Some embodiments of the client software application may comprise a video creating and/or editing tool. For example, a video creator tool may be included with the client software application to allow the combining of media such as video clips, audio, and digital photos into a movie or multimedia presentation. The tool may allow the user to choose a soundtrack, rotate images, prune video, etc. Some embodiments may allow videos to be created and then uploaded to the network site.

Figure 8:
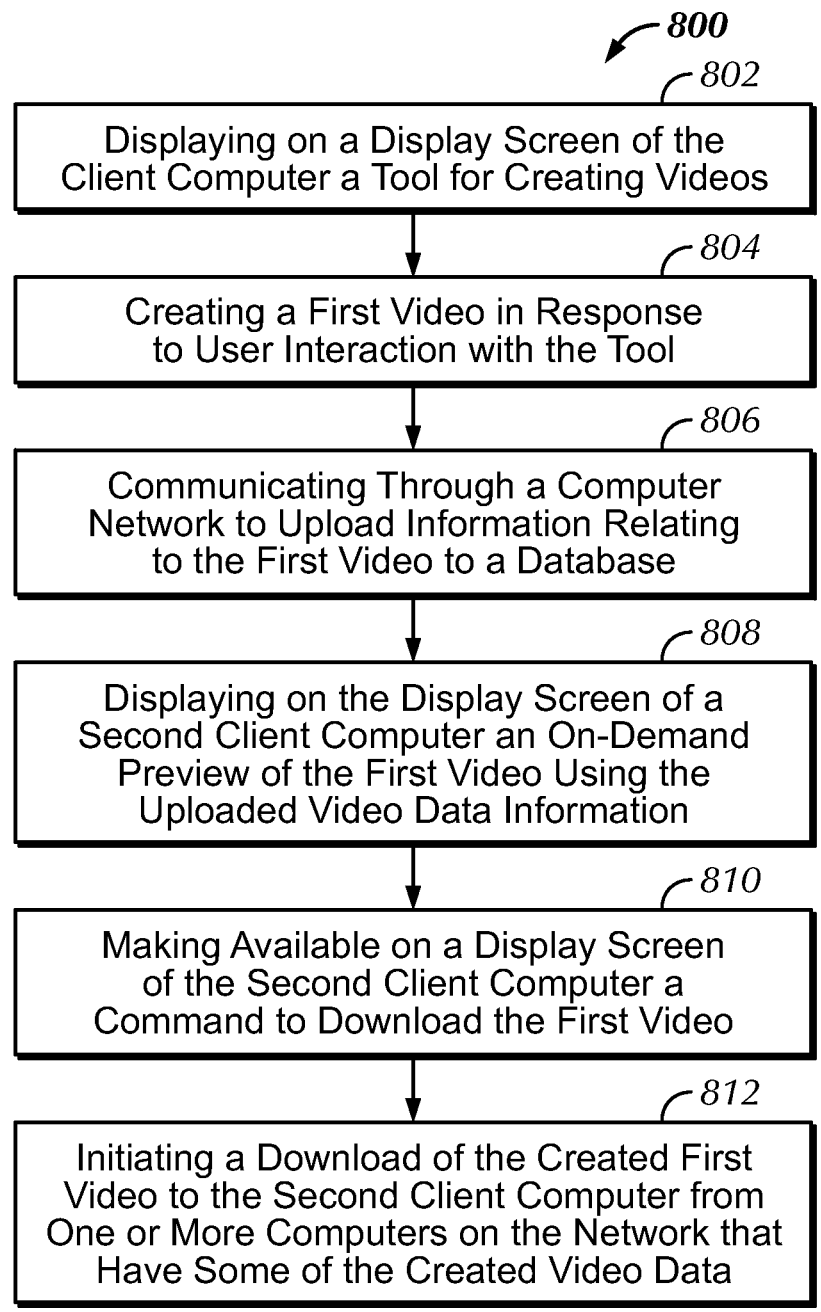
FIG. 8 is a flow diagram illustrating a method that operates in accordance with another embodiment of the present invention.

For example, in some embodiments a computer program for use in creating content may cause the client computer to execute the following steps, which are illustrated in FIG. 8 as the method 800. Namely, in step 802 a tool for creating videos may be displayed on a display screen of the client computer, and in step 804 a first video may be created in response to user interaction with the tool. In step 806 information relating to the first video may be uploaded to a database that stores information relating to a plurality of videos, including video data information of some or all of the created video clip. In step 808 an on-demand preview of the first video may be displayed on the display screen of a second client computer using the uploaded video data information. In step 810 a command to download the first video may be made available on a display screen of the second client computer. And in step 812 in some embodiments, a download of the created video to the second client computer may be triggered from one or more computers on the network that have some of the created video data in response to the user of the second client computer selecting the command. In some embodiments, the downloading of the created video may be by means of a distributed download. For example, the video may be downloaded in pieces from two or more computers or other devices on the network.

In some embodiments, the network site 104 (FIG. 1) may comprise the ability to provide media-to-go film strips, RSS (really simple syndication) feeds and other types of XML data feeds such as Video Podcasting feeds. These items may be used to add content to a social networking site 122, such as for example Friendster, MySpace, or Blogger pages, or any other site 124.

In some embodiments, the media-to-go lets a user copy and paste code directly to any HTML page. The result may comprise film strip of video and photos (e.g., in one or more diagonal, horizontal, vertical rows) that gets updated every time a new item is added to the network site 104. The user may choose a category, search term, even a particular member and have a personalized film strip that may be kept up to date. In some embodiments the client software application is not even needed.

Figure 9:
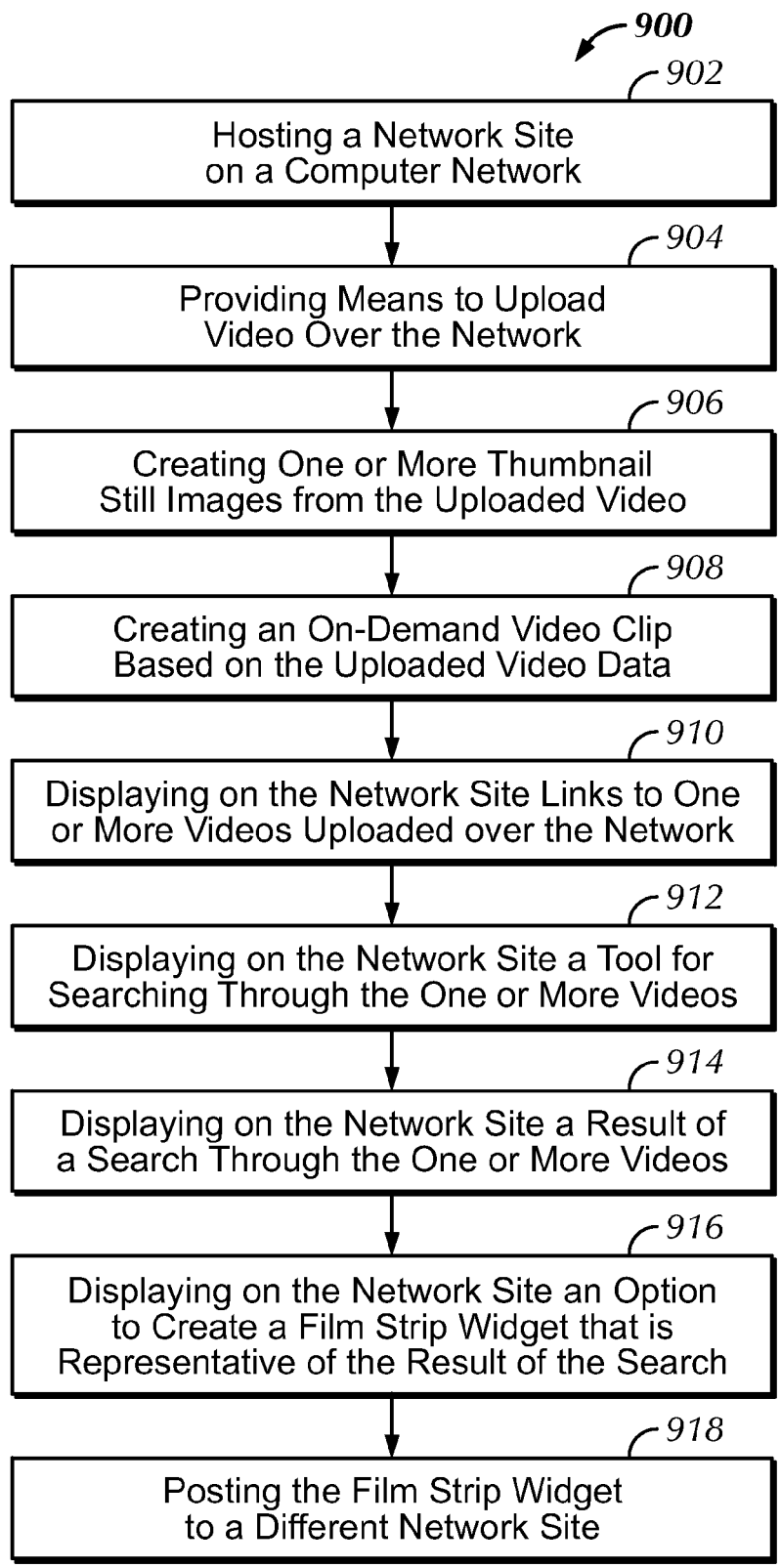
FIG. 9 is a flow diagram illustrating a method that operates in accordance with another embodiment of the present invention.

For example, in some embodiments a method for use in providing content may comprise the following steps, which are illustrated in FIG. 9 as the method 900. Namely, in step 902 a network site may be hosted on a computer network, and in step 904 a means to upload video over the network may be provided. In step 906 one or more thumbnail still images from the uploaded video may be created, and in step 908 an on-demand video clip based on the uploaded video data may be created. In step 910 links to one or more videos uploaded over the network may be displayed on the network site. In step 912 a tool for searching through the one or more videos may be displaying on the network site, and in step 914 a result of a search through the one or more videos may be displayed on the network site.

In step 916 an option may be displayed on the network site to post a film strip widget that is representative of the result of the search to a different network site. The film strip widget may include a display of the still images for the corresponding videos and a command to start an on-demand playback of the created on-demand video clip for any video included in the film strip. In step 918 the film strip widget that is representative of the result of the search may then be posted to the different network site in response to the option being selected. The film strip may then be updated. The film-strip embeddable HTML code includes identifiers that are used by the film-strip code to identify one or more video files to be displayed in the film-strip. For example, the information may include a video sharer user ID or a video search term. The film-strip code uses this information to query a server for meta-data about video such as video name, playback webpage network location, description and duration and information locating a still image thumbnail for the video on the network. This meta-data may be used by the film-strip code to display the film-strip content and to allow users to click on a thumbnail to browse the video's playback web-page and to play the video.

With respect to RSS feeds, in some embodiments step 916 may be replaced with a step of displaying on the network site an option to create a feed that will provide notifications of updates to the result of a search. Similarly, step 918 may be replaced with the step of providing notifications of updates to the result of a search to users who are subscribers to the feed.

In some embodiments, the method 900 may also include a step of providing an option to initiate a download of a selected one of the videos. In some embodiments, the downloading of the video may be by means of a distributed download. For example, the video may be downloaded in pieces from two or more computers or other devices on the network. Such filmstrips and RSS feeds may be used to keep users connected to the things that matter to them. With RSS feeds, information can be brought to the user instead of the user having to find the information. For example, a user can subscribe to receive notifications to favorite news reader software or My Yahoo! page when new listed groups are available. This may allow the user to have the most recent information on the things he or she finds interesting. Thus, an RSS feed allows a user to subscribe to the a category and see every time a new group of interest is added.

In some embodiments it can be made to work by browsing a category in the public directory web pages. An "RSS" icon may be displayed at the bottom of the page. A user may right-click on the "RSS" icon, choose "Copy Shortcut", and paste it into the user's RSS reader software. Or, in some embodiments if the user is a My Yahoo! User he or she may just click on a 'My Y!' icon to subscribe. In some embodiments, the user may subscribe to provided RSS feeds using his web-browser software application. In some cases, an HTML representation of the RSS file is displayed when the user clicks on the icon. This representation contains instructions regarding subscribing to the clicked RSS feed.

In some embodiments, when an RSS feeds contains meta-data about shared video, when a new video is shared that matches the criteria specified by the feed, it will automatically be added to the feed and subscribers will be able to be notified regarding the new video existence and are able to read video meta-data, to watch the video and to download it to their computer. For example, for an RSS feed of the publicly shared video clips by a user, when the user shares a new video, it is added to the feed and RSS readers display information about the new video when they query the feed for updates get the new RSS item that represents the video. When an RSS feed identifies a search term, when new video is shared that corresponds to this search term, the video will be included in the feed and users that are subscribed to this feed will be able to be notified when the new video is available, read video meta-data, watch the video or download it.

In some embodiments groups may be tracked by search terms. A user may subscribe to all groups that match a search term by performing a search in the directory and using the RSS icon at the bottom of search results pages. For example, if a user likes BreakBeat, just search for "breaks" and subscribe using the RSS icon at the bottom of the search results web pages to receive updates when new breaks groups are created.

In some embodiments a user may also be the first to join new groups. Interesting newly created groups may be joined by subscribe to a New Groups Feed. Users may also keep up with friends' groups. Namely, when a user sees a user nickname in the public directory web page, the user can click on it to view that user's listed groups. The "RSS" link at the bottom of the page may be used to subscribe to receive a notification when this user had created or joined a listed group.

Thus, the RSS feed helps users make the most of their media, keeping them close to their friends.

In some embodiments of the present invention the client software application may comprise a camera still image and/or video importing tool and/or wizard. Such camera import wizard can help make the client software a true end-to-end solution for getting video and photos from a user's camera to the web. For example, a camera 128 (FIG. 1) may be plugged into one of the client computers 116. In response to the camera 128 being plugged into the computer 116, a user may select the client software application when Windows asks what the user wants to do, and then the on screen instructions may be followed. Thus, in a few quick steps (or a single user action in some configurations) the media may be taken from the camera 128 and uploaded to the network site 104. In some embodiments the user may add titles, description, and tags to help friends find them easily.

Figure 10:
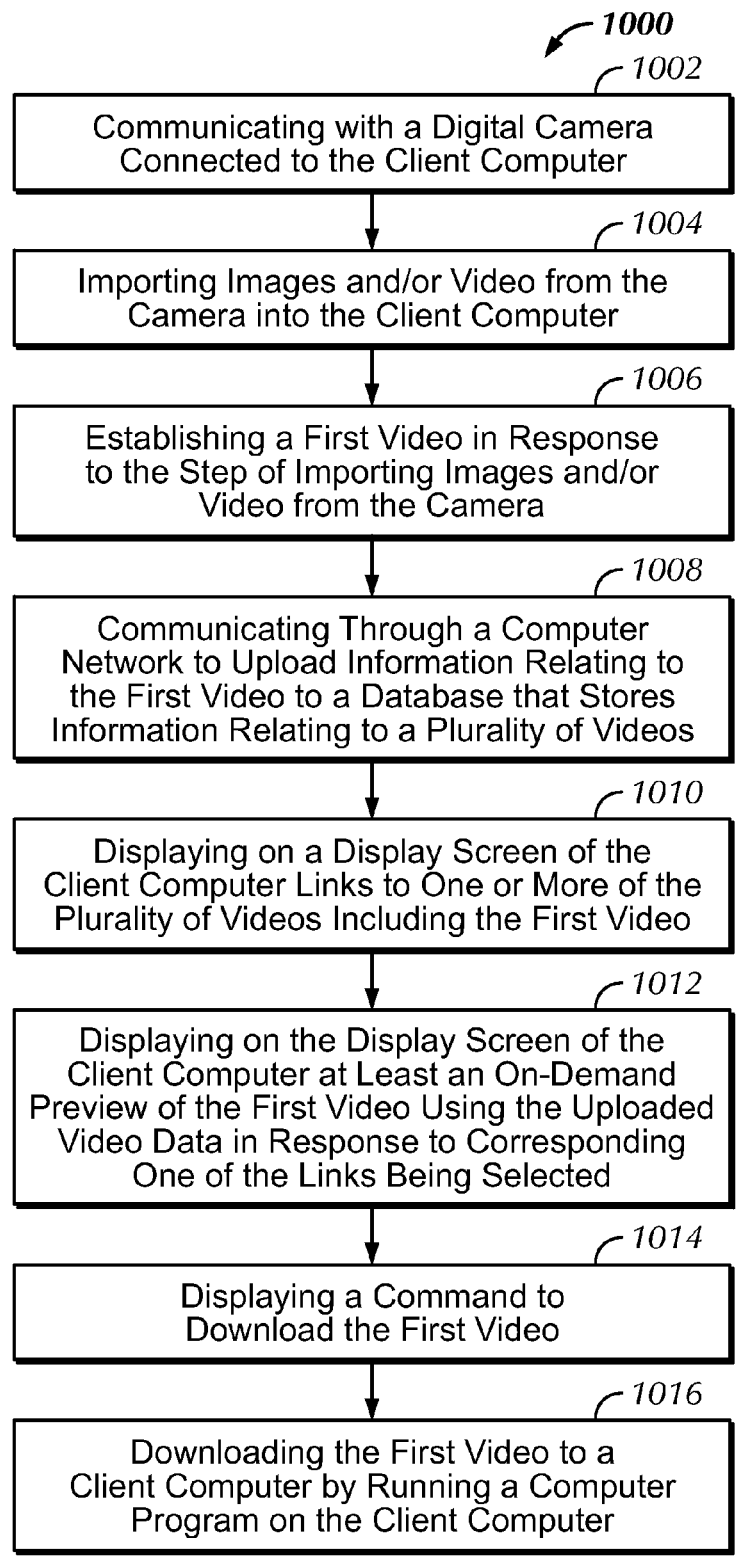
FIG. 10 is a flow diagram illustrating a method that operates in accordance with another embodiment of the present invention.

For example, in some embodiments a computer program for use in manipulating content on a client computer may cause the client computer to execute the following steps, which are illustrated in FIG. 10 as the method 1000. Namely, in step 1002 the client computer may communicate with a digital camera connected to the client computer and in step 1004 import images and/or video from the camera into the client computer. Then, in step 1006 a first video may be established in response to the step of importing images and/or video from the camera. In step 1008 the computer may communicate through a computer network to upload information relating to the first video to a database that stores information relating to a plurality of videos, including video data of some or all of the first video. In step 1010 links to one or more of the plurality of videos including the first video may be displayed on a display screen of the client computer. In step 1012 at least an on-demand preview of the first video using the uploaded video data may be displayed on the display screen of the client computer in response to a corresponding one of the links being selected. In step 1014 a command to download the first video clip may be displayed, and in step 1016 the first video may be downloaded to the client computer by running a computer program on the client computer in response to the download option being selected. In some embodiments, the downloading of the first video may be by means of a distributed download. For example, the program may download the first video in chunks, coming from two or more computers or servers on the network, similar to as described above.

In some embodiments, the network site 104 (FIG. 1) may comprise feeds for portable devices, such as portable audio and/or video players, such as for example mobile phones, PDA's, or media devices such as the popular Sony PlayStation Portable (PSP)™ or Apple iPod™. For example, a portable (or mobile) device 130 may be plugged into one of the client computers 118, and the network site 104 may provide a feed for such portable device. This helps a user transfer video into the portable (or mobile) device 130. In some embodiments, video meta-data is provided in Video Podcasting feeds and in Media RSS feeds. These extended RSS feeds allow RSS readers such as SONY PSP Media Manager and Apple iTunes that are designed to handle multimedia data such as video to download video files specified in RSS items to the users computer and to portable video playback devices for playback.

In some embodiments, some or all of the video that is available on the network site may be specially formatted to play on such portable (or mobile) devices. In some embodiments, the user does not have to download the video one file at a time. Namely, the network site may provide for the user to subscribe to personalized feeds (categories, search terms, user-specific, or single items) and the content may be downloaded automatically and synchronized to the portable device.

In some embodiments, a portable or mobile device may include media manager software, such as with some models of the Sony PlayStation Portable. The network site 104 may be configured to work with such manager software so that videos may be delivered straight to the portable device. In some embodiments, the RSS reader that is used to consume RSS feed and to download video described in these feeds, is running directly on some models of the Sony PlayStation Portable.

Figure 11:
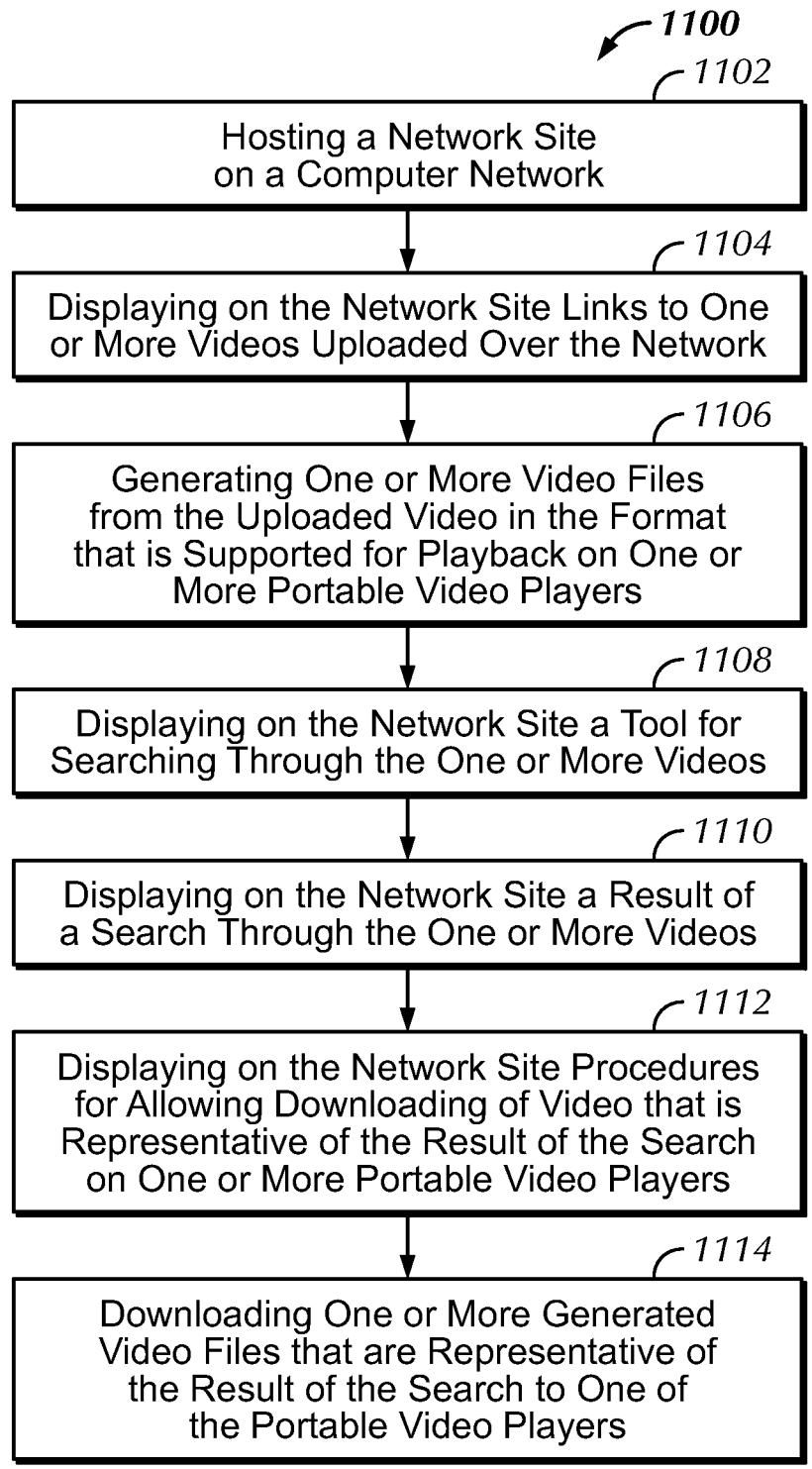
FIG. 11 is a flow diagram illustrating a method that operates in accordance with another embodiment of the present invention.

For example, in some embodiments a method for use in providing content may comprise the following steps, which are illustrated in FIG. 11 as the method 1100. Namely, in step 1102 a network site may be hosted on a computer network, and in step 1104 links to one or more videos uploaded over the network may be displayed on the network site. In step 1106 one or more video files may be generated from the uploaded video in a format that is supported for playback on one or more portable video players. In step 1108 a tool for searching through the one or more videos may be displayed on the network site, and in step 1110 a result of a search through the one or more videos may be displayed on the network site. In step 1112 procedures for allowing viewing of video that is representative of the result of the search on one or more portable video players may be displayed on the network site. And then in step 1114 one or more generated video files that are representative of the result of the search may be transferred to one of the portable video players in response to the procedures being followed. In some embodiments, the transferring or downloading of the video may be by means of a distributed download. For example, the video may be downloaded in pieces from two or more computers or other devices on the network. Each transferred video clip may be playable on the mobile video player. The video that is representative of the result of the search in the portable device may be updated.

Thus, some embodiments of the present invention provide a scalable, public and private decentralized video distribution scheme. Private large file transfers in file sharing groups may take place. The information in such transfers may be encrypted. Public large file transfers may also take place, and streaming media may be supported. The system may provide good web integration, including web integration via special URLs, and digital rights management (DRM) may also be supported.

In some embodiments the network site may include an integrated distributed search engine. In some embodiments high-quality video in play-lists may be pushed to client software based on user subscriptions and play-lists. Mobile video files may be created from user shared video in the client and distributed using a peer-to-peer (P2P) scheme. By way of example, 3GPP and MP4 may be supported.

In some embodiments a distributed download feature in a peer-to-peer (P2P) scheme may be used with distributed file blocks transfer. File blocks and hashing may be used, and file verification may be used. NAT (Network Address Translation) hole punching may be supported, and Windows XP firewall transversal may be supported to bridge fire-walled clients. Media transcoding and streaming may be used in the P2P scheme, and downloads verification may be used. It is believed that such a scheme is more scalable, cheaper and faster than centralized file distribution. It is also believed to lead to user upstream bandwidth preservation and conservation. The ability to distribute storage at the host layer may enable efficient low cost storage alternatives. Furthermore, P2P may allow for high quality content distribution that are prohibitive to centralized streaming economics. Unlimited file size and number of files shared may be supported. Any file type and video format may also be supported, and tracking, multi-sourcing and swarming may be supported. A lightweight file transfer and manager may be used, and the transfer manager may be integrated with the client video player for seamless playback experience.

A swarm may comprise the peer computers that are used in a peer-to-peer (P2P) file distribution protocol. Such concepts are explained on the Internet at: http://en.wikipedia.org/wiki/Bittorrent, the entire contents of which are hereby incorporated herein by reference in their entirety.

A low level of technical knowledge should be sufficient on the part of users to use the scheme. In some embodiments the ability to use the system may be packaged in one client software package with an easy to use and fun user interface. The client software package may be auto updateable. The client software package, which may also be referred to as the desktop client, may comprise one of the software components of the system. The network site web application may comprise another component. Other components may include P2P network servers and/or XML web services. In some embodiments digital video encoding, flash video recording, tags and related media processing, users, groups and video databases, and/or automated testing bots may also be supported.

Different embodiments may operate in different ways. For example, the network site may be focused on video or some other media. Videos may be watched on both the network site and via the client software application, or only on one or the other. In some embodiments, when videos are watched on the network site and/or via the client software application they are streamed. Similarly, videos may be shared and/or created on both the network site and via the client software application, or only on one or the other. In some embodiments the ability to publish videos may be enabled with a small number of procedures or interactions by the user, such as only one-click. In some embodiments webcam instant posting and webcam video comments may be used. In some embodiments a search engine may be used that is optimized with custom RSS feeds. In some embodiments videos may be downloaded to the desktop or to a portable device.

Figure 12:
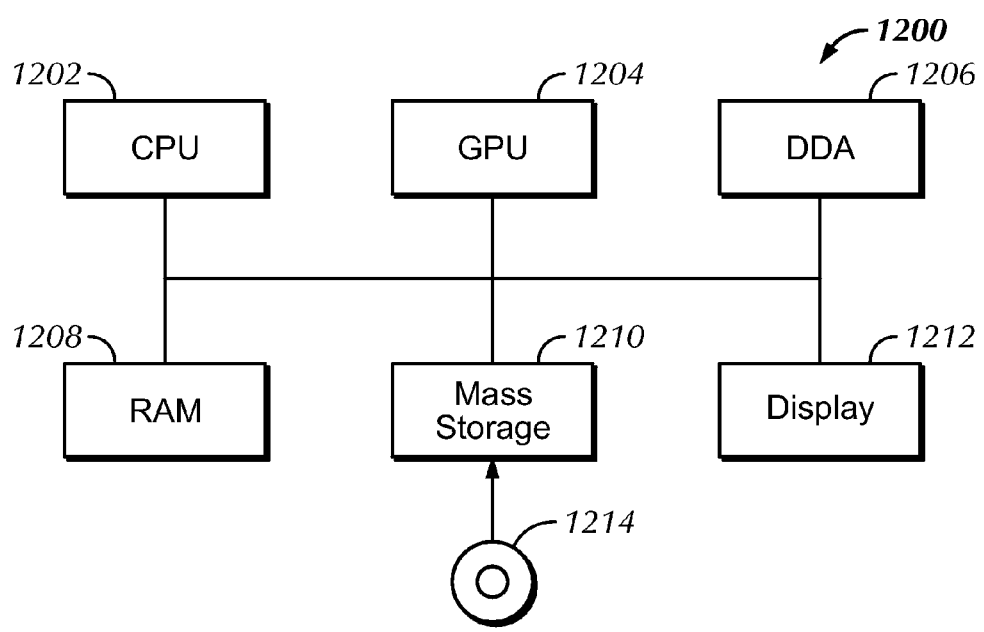
FIG. 12 is a block diagram illustrating a computer system that may be used to run, implement and/or execute the methods shown and described herein in accordance with embodiments of the present invention.

Referring to FIG. 12, there is illustrated an example system 1200 that may be used in some embodiments for implementing, running and/or executing any of the methods and/or techniques described herein. By way of example, the system 1200 or any portion(s) thereof may be used for implementing any of the client computers or devices mentioned herein. By way of further example, the system 1200 or any portion(s) thereof may be used for implementing any of the data centers mentioned herein. Use of the system 1200 or any portion thereof, however, is certainly not required.

By way of example, the system 1200 may include, but is not required to include, a central processing unit (CPU) 1202, a graphics processing unit (GPU) 1204, digital differential analysis (DDA) hardware 1206, a random access memory (RAM) 1208, and a mass storage unit 1210, such as a disk drive. Thus, in some embodiments the system 1200 comprises a processor based system. The system 1200 may be coupled to, or integrated with, a display 1212, such as for example any type of display. Again, some or all of the aforementioned components may not be needed and are not required.

The CPU 1202 and/or GPU 1204 may be used to execute or assist in executing the steps of the methods and techniques described herein, and various program content, images and/or videos may be rendered on the display 1212. Removable storage media 1214 may optionally be used with the mass storage unit 1210, which may be used for storing code that implements the methods, techniques and/or features described herein. However, any of the storage devices, such as the RAM 1208 or mass storage unit 1210, may be used for storing such code. Either all or a portion of the system 1200 may be embodied in any type of device, such as for example a television, computer, video game console or system, portable device, handheld device, or any other type of device, including any type of device mentioned herein.

Figure 13:
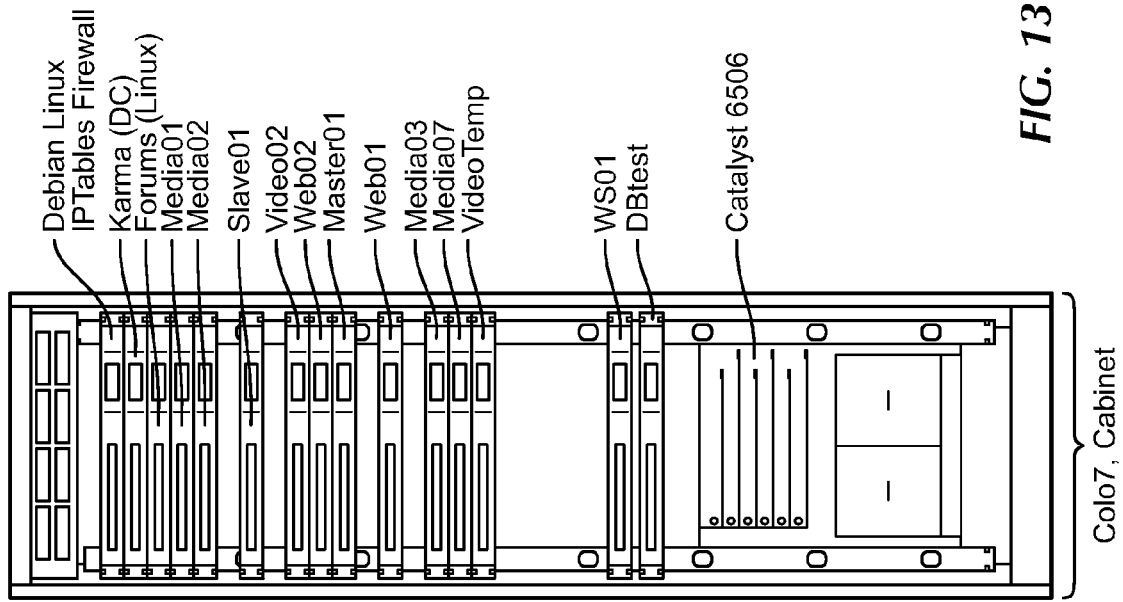
FIGS. 13, 14 and 15 are schematic diagrams illustrating example physical layouts that may be used for the data center shown in FIG. 1 in accordance with embodiments of the present invention.
Figure 13:
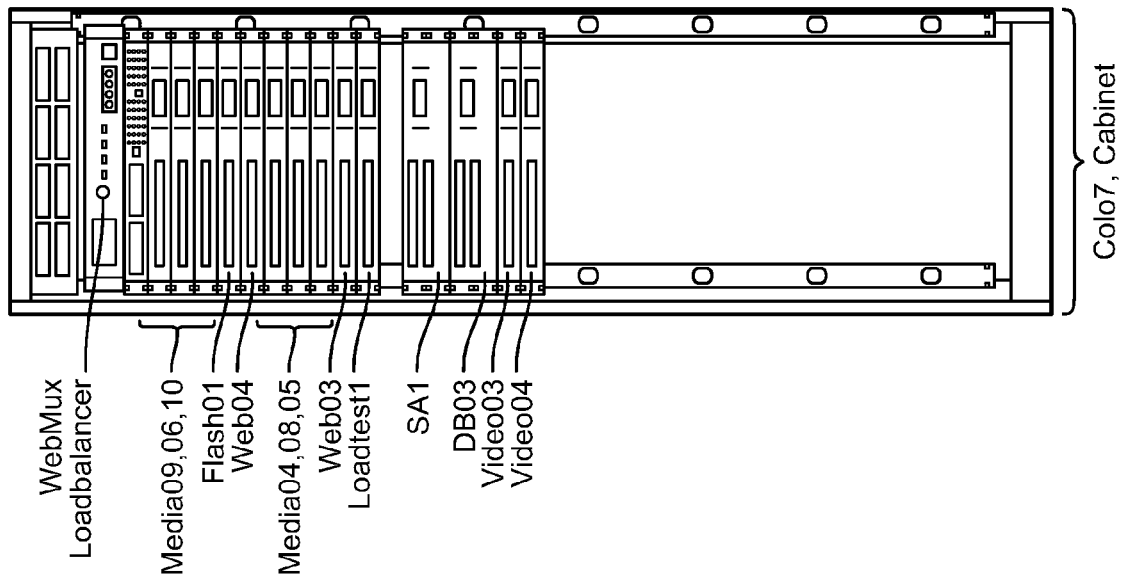
Figure 14:
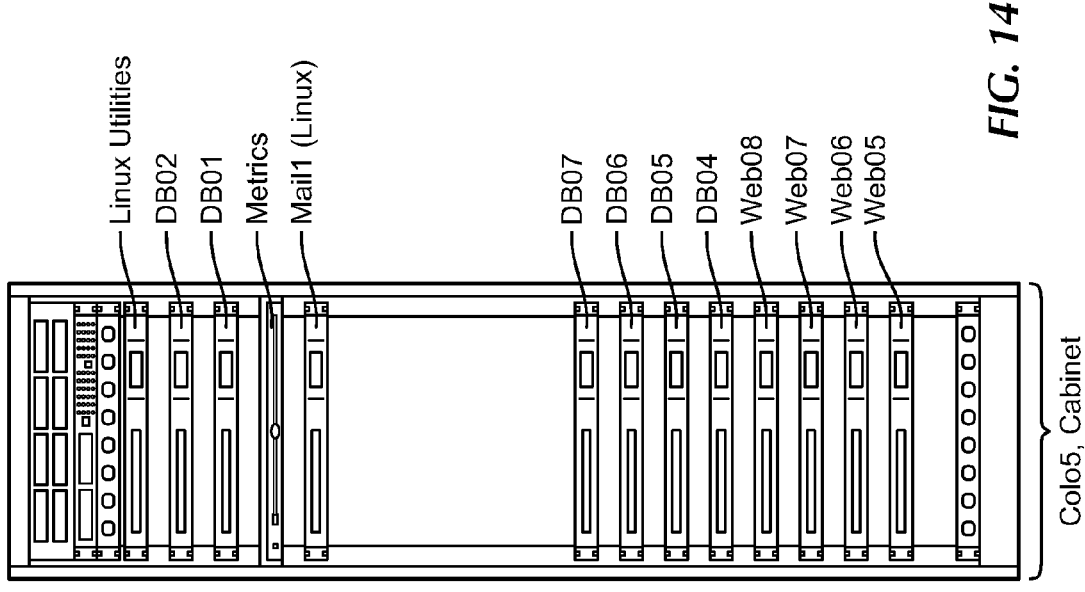
Figure 14:
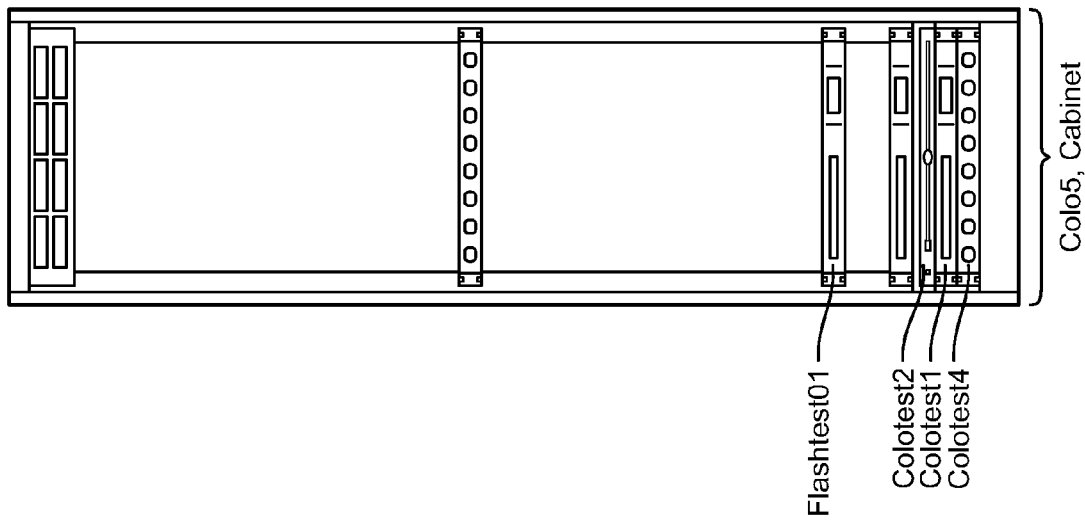
Figure 15:
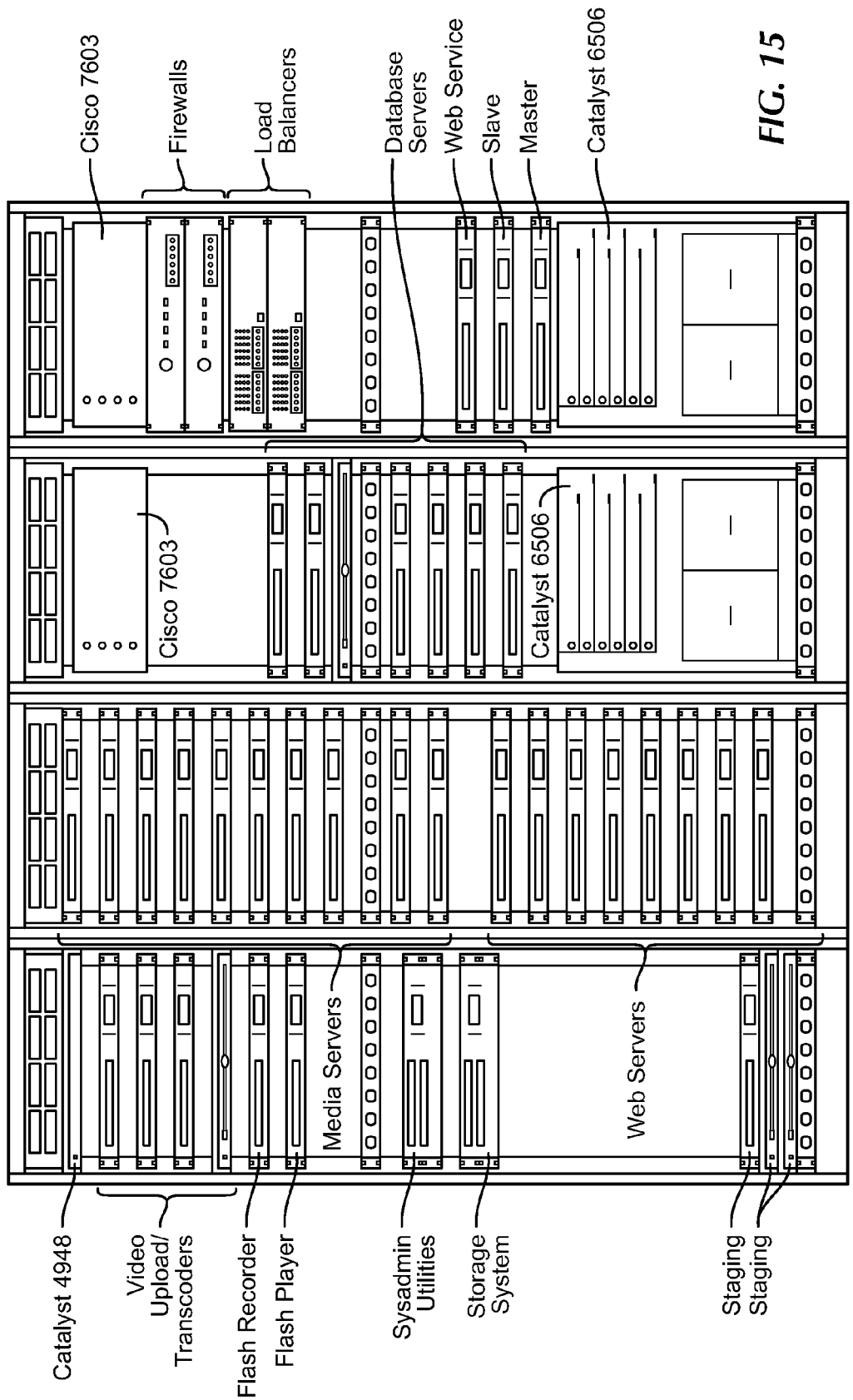

Example physical layouts that may be used for the data center 106 (FIG. 1) in some embodiments are illustrated in FIGS. 13, 14 and 15. For example, in FIG. 13 two cabinets may be used and may provide for a GNI (ISP) termination point. For networking, additional redundancy may be used, and a single load balancer and a single catalyst may be used. For servers, redundant media servers (MediaX) may be used, and redundant web and video servers (WebX, VideoX) may be used. For the test/staging environment, it may supports a QA process.

For example, in FIG. 14 four cabinets may be used. A new catalyst switch may be used to facilitate migration and provide redundancy for network. An active directory may be used for central control of services, authentication, etc. An exchange mail server may be used, and it may be outbound only.

While the invention herein disclosed has been described by means of specific embodiments and applications thereof, numerous modifications and variations could be made thereto by those skilled in the art without departing from the scope of the invention set forth in the claims.

What is claimed is:

1. A non-transitory storage medium storing a computer program for use in creating content on a client computer, the computer program causing the client computer to execute steps comprising:
    displaying on a display screen of the client computer a tool for creating videos;
    creating a first video in response to user interaction with the tool;
    communicating through a computer network to upload information relating to the first video to a database that stores information relating to a plurality of videos including video data information of some or all of the created first video;
    displaying on the display screen of a second client computer an on-demand preview of the first video using the uploaded video data information;
    making available on a display screen of the second client computer a command to download the first video;
    initiating a download of the created first video to the second client computer in pieces from two or more computers on the network that have some of the created video data in response to the user of the second client computer selecting the command;
    displaying on the display screen of the client computer a tool for searching through the plurality of videos;
    displaying on the display screen a result of a search through information stored at the database and relating to the plurality of videos;
    displaying on the display screen an option to create a film strip widget that is representative of the result of the search, wherein the film strip widget includes display of still images for corresponding videos identified in the search and a command to start an on-demand playback of the created on-demand video clip for any video included in the film strip;
    and posting the film strip widget that is representative of the result of the search to a different network site in response to the option being selected.

2. A non-transitory storage medium in accordance with claim 1, wherein the tool for creating videos is configured to allow for a combining of different types of media into a video.

3. A non-transitory storage medium in accordance with claim 2, wherein the different types of media comprise video clips, audio and digital photographs.

4. A non-transitory storage medium in accordance with claim 1, wherein the tool for creating videos is configured to allow a user to choose a soundtrack for a video.

5. A non-transitory storage medium in accordance with claim 1, wherein the tool for creating videos is configured to allow a user to manipulate images.

6. A method for use in creating content, comprising:
    displaying on a display screen of a client computer a tool for creating videos;
    creating a first video in response to user interaction with the tool;
    communicating through a computer network to upload information relating to the first video to a database that stores information relating to a plurality of videos including video data information of some or all of the created first video;
    displaying on the display screen of a second client computer an on-demand preview of the first video using the uploaded video data information;
    making available on a display screen of the second client computer a command to download the first video;
    initiating a download of the created first video to the second client computer in pieces from two or more computers on the network that have some of the created video data in response to the user of the second client computer selecting the command;
    displaying on the display screen of the client computer a tool for searching through the plurality of videos;
    displaying on the display screen a result of a search through information stored at the database and relating to the plurality of videos;
    displaying on the display screen an option to create a film strip widget that is representative of the result of the search, wherein the film strip widget includes display of still images for corresponding videos identified in the search and a command to start an on-demand playback of the created video clip for any video included in the film strip; and posting the film strip widget that is representative of the result of the search to a different network site in response to the option being selected.

7. A method in accordance with claim 6, wherein the tool for creating videos is configured to allow for a combining of different types of media into a video.

8. A method in accordance with claim 7, wherein the different types of media comprise video clips, audio and digital photographs.

9. A method in accordance with claim 6, wherein the tool for creating videos is configured to allow a user to choose a soundtrack for a video.

10. A method in accordance with claim 6, wherein the tool for creating videos is configured to allow a user to manipulate images.

11. A system for use in creating content, comprising:
a first client computer that is configured to display on a display screen of the first client computer a tool for creating videos, create a first video in response to user interaction with the tool, communicate through a computer network to upload information relating to the first video to a database that stores information relating to a plurality of videos including video data information of some or all of the created first video, display on the display screen of the first client computer a tool for searching through the plurality of videos, display on the display screen a result of a search through information stored at the database and relating to the plurality of videos, display on the display screen an option to create a film strip widget that is representative of the result of the search, wherein the film strip widget includes display of still images for corresponding videos identified in the search and a command to start an on-demand playback of the created on-demand video clip for any video included in the film strip, and post the film strip widget that is representative of the result of the search to a different network site in response to the option being selected; and a second client computer that is configured to display on a display screen of the second client computer an on-demand preview of the first video using the uploaded video data information and a command to download the first video, and that is configured to initiate a download of the created first video to the second client computer in pieces from two or more computers on the network that have some of the created video data in response to the user of the second client computer selecting the command.

12. A system in accordance with claim 11, wherein the tool for creating videos is configured to allow for a combining of different types of media into a video.

13. A system in accordance with claim 12, wherein the different types of media comprise video clips, audio and digital photographs.

14. A system in accordance with claim 11, wherein the tool for creating videos is configured to allow a user to choose a soundtrack for a video.

15. A system in accordance with claim 11, wherein the tool for creating videos is configured to allow a user to manipulate images.

16. A non-transitory storage medium in accordance with claim 1, further comprising:
displaying on the network site an option to create a feed that will provide notifications of updates to the result of the search; and
providing notifications of updates to the result of a search to users who are subscribers to the feed;
wherein an update to the result of the search comprises a new video being shared that matches a criterion specified by the search.

17. A non-transitory storage medium in accordance with claim 16, further comprising:
allowing a user to copy and paste code directly to an HTML page; generating, from the HTML page, a second film strip;
wherein the generating, from the HTML page, the second film strip comprising generating the second film strip comprising video and photos.

18. A non-transitory storage medium in accordance with claim 1, wherein the initiating the download of the created first video in pieces from the two or more computers further comprises limiting uploading where a first of the two or more computers defines a restriction in uploading pieces of content of video, where the restriction restricts uploading of a corresponding one or more of the pieces of the created first video such that a portion of an available network bandwidth available to the first of the two or more computers in uploading the one or more pieces of the create first video remains below a defined percentage of the available network bandwidth available to the first of the two or more computers.

19. A non-transitory storage medium in accordance with claim 18, wherein the initiating the download of the created first video in pieces from the two or more computers comprises causing the first of the two or more computers such that a bridge transfer takes place to transfer a piece of the first video between the second client computer and a nonroutable host using a routable host.

\* \* \* \* \*

UNITED STATES PATENT AND TRADEMARK OFFICE
CERTIFICATE OF CORRECTION

PATENT NO.       : 8,881,011 B2  
APPLICATION NO.  : 11/950206  
DATED            : November 4, 2014  
INVENTOR(S)      : Eyal et al.

Page 1 of 1

It is certified that error appears in the above-identified patent and that said Letters Patent is hereby corrected as shown below:

In the Claims  
Column 18, Lines 47-48, Claim 19, after "computers" delete "comprises causing the first of the two or more computers".

Signed and Sealed this  
Twenty-first Day of April, 2015

Michelle K. Lee  
*Director of the United States Patent and Trademark Office*